(12) United States Patent
Uehara

(10) Patent No.: US 6,961,165 B2
(45) Date of Patent: Nov. 1, 2005

(54) OPTICAL MODULATION DEVICE HOLDING BODY, OPTICAL DEVICE, AND PROJECTOR

(75) Inventor: Taisuke Uehara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/733,405

(22) Filed: Dec. 12, 2003

(65) Prior Publication Data

US 2004/0233548 A1  Nov. 25, 2004

(30) Foreign Application Priority Data

Dec. 24, 2002 (JP) .......................................... 2002-373162

(51) Int. Cl.⁷ ............................. G02F 1/01; G02F 1/03; G02F 1/1333; G03B 21/14; H04N 1/04

(52) U.S. Cl. ....................... 359/237; 359/246; 359/618; 359/822; 353/100; 353/101; 353/20; 353/52; 358/483; 349/58; 349/63

(58) Field of Search ................................. 353/101, 119, 353/20, 31, 52, 57, 61, 67, 100; 349/58, 63, 161; 358/483, 474; 359/618, 237, 238, 245, 246, 822

(56) References Cited

U.S. PATENT DOCUMENTS

| | | | | |
|---|---|---|---|---|
| 6,547,402 B2 | * | 4/2003 | Masuda ....................... | 353/101 |
| 6,623,128 B2 | * | 9/2003 | Kan ............................ | 353/74 |
| 6,806,920 B2 | * | 10/2004 | Hayashi et al. ................ | 349/58 |
| 6,819,464 B2 | * | 11/2004 | Fujimori et al. ............. | 359/246 |
| 6,829,110 B2 | * | 12/2004 | Watanabe .................... | 359/822 |
| 6,830,338 B2 | * | 12/2004 | Ogawa ........................ | 353/20 |
| 6,831,760 B2 | * | 12/2004 | Kimura ....................... | 358/483 |
| 6,844,993 B2 | * | 1/2005 | Fujimori et al. ............. | 359/820 |

FOREIGN PATENT DOCUMENTS

JP  2000-221588  8/2000

* cited by examiner

*Primary Examiner*—Loha Ben
(74) *Attorney, Agent, or Firm*—Oliff & Berridge, PLC

(57) ABSTRACT

The invention provides a panel fixing plate as an optical modulation device retainer having a substantially c-shaped fixing section body viewed from the top, an arm section formed at a tip side of the fixing section body, a pin protruding from the arm section, and a spring member biasing an emission-side polarization plate as an optical conversion element with respect to the fixing section body. Liquid crystal panels, each as light modulators, are securely fixed to a panel fixing plate with the pin inserted into each corresponding hole.

The emission-side polarization plate can be inserted into the substantially c-shaped fixing section body when viewed from the top so as to be biased and fixed to the fixing section body by the spring member. An optical modulation device retainer, an optical device, and a projector of this invention, light modulators and/or optical conversion elements can be exchanged with ease, and the reworkability can be improved.

33 Claims, 11 Drawing Sheets

OPTICAL MODULATION DEVICE HOLDING BODY, OPTICAL DEVICE, AND PROJECTOR

BACKGROUND OF THE INVENTION

1. Field of Invention

The present invention relates to an optical modulation device retainer for retaining an optical modulation device that modulates color light beams depending on image information, an optical device, and a projector.

2. Description of Related Art

Currently a projector exist that are of a type including a plurality of optical modulation devices for modulating various color light beams on a color light beam basis in accordance with image information, a color synthesizing optical device for forming optical images through synthesis of the modulated color light beams, and a projection lens for enlarging and projecting thus formed optical images.

In the projector of such a type, a dichroic mirror exemplified for a color separation optical system separates a light flux coming from a light source into color light beams of three colors. Three optical modulation devices each structured by a liquid crystal panel, or the like, can perform modulation on a color light beam basis in accordance with image information. A cross dichroic prism exemplified for a color synthesizing optical device forms optical images by synthesizing the modulated color light beams. The projection lens enlarges and projects the resulting optical images.

In such a projector, the optical modulation devices all have to be located at the back focus position of the projection lens. Moreover, to obtain clearer images, the projector needs to prevent pixel displacement among the optical modulation devices, and distance change from the projection lens.

In view thereof, as disclosed in for example, JP-A-2000-221588, at the time of projector manufacturing, it is known that focus adjustment for correctly placing the optical modulation devices at the back focus position of the projection lens, and alignment adjustment for pixel matching among the optical modulation devices are applied with high accuracy. Then, the optical device is directly fixed to a light flux incident end face of the color synthesizing optical device after the optical modulation devices are adjusted in position.

This optical device is so structured that a liquid crystal panel is accommodated in a retaining frame having a hole formed at its four corners, and the holes are each inserted with a pin whose surrounding is coated with adhesives. Then, the end face of the pin can be securely affixed together with the light flux incident end face of the cross dichroic prism, and the side face of the pin with the corresponding hole of the retaining frame. At the rear stage of the liquid crystal panel, a polarization plate is placed as an optical conversion element. This polarization plate is directly attached to the light flux incident end face of the cross dichroic prism.

SUMMARY OF THE INVENTION

With the optical device in the above structure, the optical modulation devices are securely affixed to the light flux incident end face of the cross dichroic prism via the pins which increase the number of components. This results in rather difficult manufacturing processes, and also in a complicated task of exchanging the optical modulation device if the optical modulation device becomes out of order.

Moreover, the polarization plate can be attached to the light flux incident end face of the cross dichroic prism. This causes the following problems at the time when the polarization plate is exchanged due to deterioration by heat.

In detail, after the polarization plate is stripped off from the cross dichroic prism, the adhesive and others still remain on the cross dichroic prism. This can make it difficult to place a new polarization plate to the cross dichroic prism for position adjustment again.

Further, due to such adhesives and others remaining on the cross dichroic prism, a new polarization plate cannot be placed at any predetermined position. Further, due to the polarization plate locating between the optical modulation devices and the cross dichroic prism, stripping off the polarization plate from the cross dichroic prism requires removal of the optical modulation devices. As such, exchanging only the polarization plate is not possible.

In view of such problems, an object of the invention is to provide an optical modulation device, an optical device, and a projector with which optical modulation devices and/or optical conversion elements can be exchanged with ease, and the reworkability can be thus improved.

An optical modulation device retainer of the invention can be an optical modulation device retainer for retaining an optical modulation device that modulates an incoming light flux in accordance with image information. The retainer can include a rectangular plate-like body having an opening section at almost the center thereof for passing through the incoming light flux, a pair of standing pieces protruding from a pair of parallel side edges of the rectangular plate-like body to extend along the direction into which an end edge of the rectangular plate-like body extends, an extension section provided at the tip of each of the standing pieces to extend toward the opposing standing piece, and an optical modulation device fixing section formed at the tip of the extension section to fix the light modulation device. Into a space enclosed by the rectangular plate-like body and the pair of standing pieces, inserted are at least one or more optical conversion elements each including a substrate formed with an optical conversion film for converting the optical property of the incoming light flux. These optical conversion elements are characteristically fixed with biased in the direction of the substrate thickness by a bias member.

Herein, the standing piece may be so formed as to have the same length as the side edge of the rectangular plate-like body. In an alternative structure, a plurality of standing pieces may be protruded from the side edge of the rectangular plate-like body. Similarly, the extension section maybe so formed as to have the same length as the standing piece, or alternatively, a plurality of extension sections may be extended from the tip of the standing piece. Further, the bias member can be composed of either one or more member.

Still further, various type such as a polarization plate, a phase difference plate, an optical compensation plate (e.g., viewing angle correction plate, color compensation film), may be used for the optical conversion element.

According to the invention, the optical modulation device can be fixed by the optical modulation device retainer structured by the rectangular plate-like body, the standing pieces, the extension section, and the optical modulation device fixing section. Thus, unlike the optical device of a conventional structure, there is no need for pins structured as independent components. This favorably reduces the number of components. Accordingly, even if the optical modulation device becomes out of order, the optical modulation device can be easily exchanged.

Moreover, with such an optical modulation device retainer, a space is formed by the rectangular plate-like body and a pair of standing pieces. This space can be inserted with the optical conversion element, thereby allowing not only the optical modulation device but also the optical conversion element to be fixed.

Further, the space enclosed by the rectangular plate-like body and the pair of standing pieces is inserted with the optical conversion element, and the optical conversion element is fixed with biased in the direction of the substrate thickness by the bias member. With such a structure, the optical conversion element can be fixed without using the adhesive as is conventionally used. And if the bias member is removed from the optical modulation device retainer, the substrate structuring the optical conversion element becomes not biased any more, and thus the optical conversion element can be easily exchanged.

As is evident from the above, the reworkability of the optical modulation device and/or optical conversion element is improved, and thus an object of the invention can be successfully achieved.

In the optical modulation device retainer of the invention, the optical modulation device can be provided with a optical modulation element for performing optical modulation, and a retaining frame having an opening section corresponding to an image formation region of this optical modulation element, and being formed with at least two holes. The extension section is preferably so formed as to correspond to the holes of the retaining frame, and the optical modulation device fixing section is preferably a pin protruding from the extension section to be inserted into the hole of the retaining frame.

According to the invention, the optical modulation device retainer can be provided with the pins for fixing the retaining frame. Compared with the optical device of a conventional structure, for example, the optical modulation device can be easily adjusted in position by changing the positional relationship between the optical modulation device and the optical modulation device retainer via the pins. Further, the optical modulation devices can be fixed to the optical modulation device retainer with a greater strength, whereby the optical modulation devices are not displaced that much once having been subjected to position adjustment.

With the optical modulation device retainer of the invention, the optical modulation device fixing section is preferably tapered, narrowing from the base end side toward the tip end side.

According to the invention, by using a tapered pin narrowing from the base end side toward the tip end side for the optical modulation device fixing section, if a light curing adhesive is used to fix the optical modulation device to the optical modulation device retainer, retainer, for example, the adhesive can be cured in a short time by light irradiation from the tip end side of the pin. Accordingly, with the optical modulation device retainer, the manufacturing efficiency of the optical device, by extension, of optical equipment adopting the optical device can be improved.

With the optical modulation device retainer of the invention, the inner surfaces of the pair of standing pieces are preferably each formed with a protrusion section extending along the insertion direction of the optical conversion element, and the bias member preferably biases the substrate of the optical conversion element to the protrusion section. Herein, either one or more protrusion sections may be formed at the respective inner surfaces of the pair of standing pieces. That is, the protrusion section may be formed in consideration of the number of the optical conversion elements to be inserted.

According to the invention, for example, when the optical conversion elements are structured by a pair, the bias member may be so structured as to bias the pair of optical conversion elements to the protrusion section. If this is the case, a pair of optical conversion elements can be collectively fixed by a single bias member.

As another example, even if two or more pairs of optical conversion elements are structured, providing a plurality of protrusion sections will enable fixation of the optical conversion elements on a pair basis by a plurality of bias members, allowing efficient use of the space enclosed by the rectangular plate-like body and a pair of standing pieces. Further, the optical conversion element is biased to the protrusion section formed along the insertion direction of the optical conversion element by the bias member. Thus, the position displacement into the direction orthogonal to the insertion section can be reduced.

In the optical modulation device retainer of the invention, the bias member is preferably provided with an engagement section for engaging with an optical element insertion side end section of the standing piece, and a spring-like section formed to extend from the end part of this engagement section to bias the substrate by abutting to the substrate of the optical conversion element.

According to the invention, the bias member can be provided with an engagement section and a spring-like section formed integrally. The engagement section engages with an optical element insertion side end section of the standing piece, whereby the bias member can be easily inserted or extracted. Thus, bias application by the bias member with respect to the optical conversion element can be changed in level with ease. This eases exchanging of the optical conversion elements to a greater degree.

With the optical modulation device retainer of the invention, the rectangular plate-like body or the standing piece is preferably formed with a support surface for supporting an end part of the optical conversion element to be inserted into a space enclosed by the rectangular plate-like body and the pair of standing pieces.

According to the invention, the rectangular plate-like body or the standing piece is formed with the support surface. Thus, for example, if the support surface is so structured as to allow the inserting optical conversion element to be placed thereon, the optical conversion element can be favorably remained biased by the bias member.

With the optical modulation device retainer of the invention, the rectangular plate-like body is preferably formed with a notch for absorbing any change caused by heat.

According to the invention, even if the optical modulation device retainer receives any thermal stress by the heat produced by the optical modulation device and/or the optical conversion element, the adhesive serves well by reducing any distortion caused by the heat with the color synthesizing optical device. What is better, the optical modulation device retainer does not change in outer shape that much. As a result, optical modulation device and/or the optical conversion element can be prevented from position displacement. Especially when this optical modulation device retainer is used for an optical device, by extension, to a projector adopting the same, this enables to appropriately position the optical modulation device and/or the optical conversion element having been subjected to position adjustment. Accordingly, pixel displacement of projection images can be avoided, and images of high quality can be derived.

The optical device of the invention is an optical device including, as a piece, a plurality of optical modulation devices for modulating a plurality of color light beams on a color light beam basis in accordance with image information, and a color synthesizing optical device for synthesizing the color light beams having been subjected to modulation by the optical modulation devices. Therein, the above-described optical modulation device retainer is included, and the optical modulation device is characteristically fixed to the color synthesizing optical device via the optical modulation device retainer.

Here, the expression of fixture to the color synthesizing optical device includes not only the exemplary structure in which the color synthesizing optical device itself is directly fixed using the adhesive, for example, but also the structure in which a base is fixed using the adhesive if the base or others are fixed to the end face orthogonal to the light flux incident end face of the color synthesizing optical device.

According to the invention, almost the same effects as the above-described optical modulation device retainer can be achieved. In detail, even if the optical modulation device is fixed to the color synthesizing optical device via the optical modulation device retainer, it is easy to exchange the optical modulation device and/or the optical conversion element with respect to the optical device being a single piece therewith, successfully increasing the reworkability of the optical device.

With the optical device of the invention, the optical conversion element to be inserted into the space enclosed by the rectangular plate-like body and the pair of standing pieces of the optical modulation device retainer is preferably a polarization element for converting the polarization axis of the incoming light flux. The polarization element preferably includes two or more polarization films whose polarization axes are parallel to each other, and which have different light absorption properties.

The issue here is that, at the time of converting the polarization axis of the incoming light flux, the polarization element as the optical conversion element passes the light flux directing along the polarization axis of the polarization element, and absorbs any other light fluxes. Therefore, the polarization element easily produces heat, causing heat deterioration.

According to the invention, the optical conversion element structurally includes two or more polarization films varying in light absorption property, although the conventional optical conversion element includes only one polarization film. Accordingly, the heat of the light fluxes to be absorbed by the respective polarization films is proportionately divided. Thus, the heat amount to be absorbed by each of the polarization films is reduced, resultantly the heat deterioration does not easily occur. Thus, the resistance of the polarization films can be increased, and the reliability of the polarization film function can be retained.

With the optical device of the invention, the optical conversion element including the substrate formed with at least two or more polarization films is preferably so placed as to sandwich the protrusion section, and is preferably fixed with the substrate thereof biased by the bias member, and the at least two or more polarization films are preferably placed with a certain space therebetween by the protrusion section.

According to the invention, by the protrusion section, at least two or more polarization films are placed with a certain space therebetween. Thus, the heat divided proportionately by the at least two or more polarization films can be effectively released. What is more, the resistance of the polarization films can be increased, and the reliability of the polarization film function can be retained.

Further, with the optical device of the invention, the back surface of the rectangular plate-like body to which the standing piece of the optical modulation device retainer is preferably formed is fixed to the color synthesizing optical device using a thermosetting adhesive or a light curing adhesive. The back surface of the rectangular plate-like body is preferably grained.

According to the invention, as the back surface of the rectangular plate-like body is grain-finished, at the time when the optical modulation device retainer is fixed to the color synthesizing optical device using the adhesive and others, the adhesive area is increased, and thus the optical modulation device retainer can be fixed to the color synthesizing optical device with a greater strength. Accordingly, the optical modulation device is not displaced so much with respect to the color synthesizing optical device.

In the optical device of the invention, as to the rectangular plate-like body of the optical modulation device retainer, an indented section is preferably formed to a part of the end surface thereof to be fixed to the color synthesizing optical device.

According to the invention, with such an indented section formed in a part of the end surface to be fixed to the color synthesizing optical device, if the optical modulation device is required to be exchanged during or after its manufacturing process, for example, the optical modulation device can be much easily removed. That is, by inserting a tool such as a driver into this indented section, a task of stripping off the optical modulation device retainer from the color synthesizing optical device can be easily done.

With the optical device of the invention, at the tip of the standing piece of the above-described optical modulation device retainer is preferably formed with a support surface for supporting any other optical conversion elements.

According to the invention, it can be possible to securely fix a plurality of optical conversion elements to the optical modulation device retainer, whereby the optical device can be easily integrated.

With the optical device of the invention, the standing piece can preferably be formed to have the same length as a pair of parallel side edges of the rectangular plate-like body.

According to the invention, it can prevent any unnecessary light flux from going among the optical modulation device and the color synthesizing optical device. As a result, optical images emitted from the color synthesizing optical device can be clearly kept.

The projector of the invention is characterized in including a light source, the above-described optical device, and a projection optical system for enlarging and projecting optical images to be emitted from this optical device.

According to the invention, effects same as the above-described optical device can be enjoyed. Further, with the above-described optical device, optical modulation devices and/or optical conversion elements in the projector can be exchanged with ease, and the reworkability of the projector can be thus better.

BRIEF DESCRIPTION OF THE DRAWINGS

The invention will with reference to the accompanying drawings, wherein like numerals reference like elements, and wherein.

DETAILED DESCRIPTION OF PREFERRED EMBODIMENTS

An embodiment of the invention is described by referring to the accompanying drawings as follows.

Figure 1:
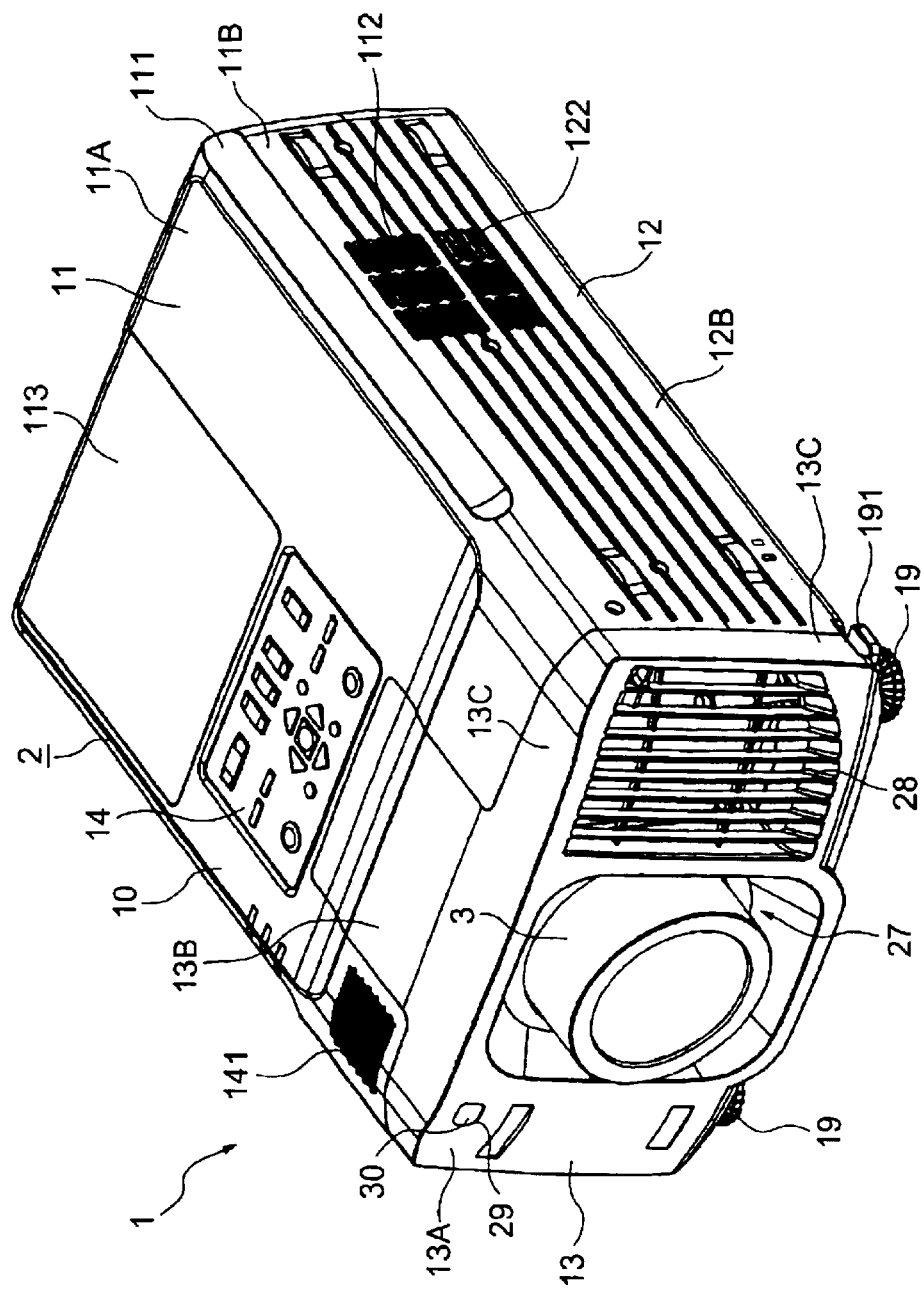
FIG. 1 is a schematic perspective view showing the outer structure of a projector according to an embodiment of the invention.
Figure 2:
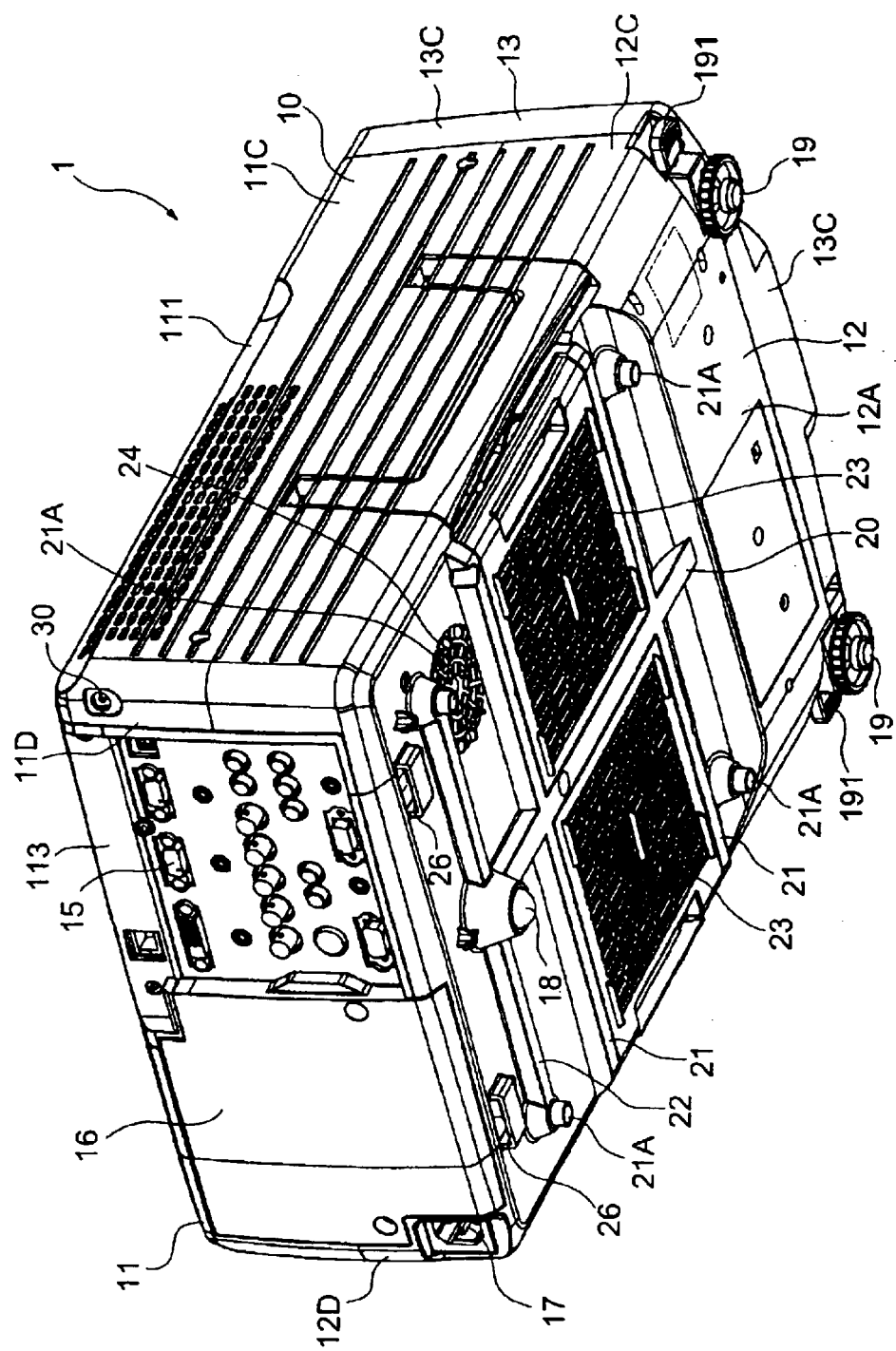
FIG. 2 is a schematic perspective view showing the outer structure of the projector of the embodiment.

FIGS. 1 and 2 both show a projector 1 according to an embodiment of the invention. FIG. 1 is a perspective view viewed from the above of the front side, and FIG. 2 is a perspective view seen from the rear side.

This projector 1 is optical equipment for modulating light fluxes coming from a light source in accordance with image information, and enlarging and projecting the results on a projection surface such as a screen. Included therein are: an exterior case 2 as an electronic equipment cabinet for housing therein a device body including an optical unit that will be described later; and a projection lens 3 as a projection optical system exposing from the exterior case 2. This projector 1 can be placed in large shops, public spaces, and the like, to provide video information to many viewers by displaying projection images onto a large sized screen.

The projection lens 3 has a function serving as a projection optical system for enlarging and projecting optical images formed by modulating, in accordance with image information, a light flux coming from a light source by a liquid crystal panel as an optical modulation device, which will be described in greater detail below. It is so structured as a group lens accommodating a plurality of lenses in a tube barrel.

The exterior case 2 as a cabinet is in the shape of rectangular parallelepiped whose depth dimension along the projection direction of which is longer than the width dimension that is orthogonal thereto. In the structure, included are a sheet body 10 covering the device body, and a frame body for bearing the case strength, which will be described later.

The sheet body 10 is provided with an upper case 11 covering the upper part of the device body, a lower case 12 covering the lower part of the device body, and a front case 13 covering the front part of the device body. These cases 11 to 13 are made of synthesis resin and integrally molded by injection molding, for example.

The upper case 11 includes a cabinet upper surface section 11A covering the upper part of the device body, cabinet side surface sections 11B and 11C almost going down from the end part of the cabinet upper surface section 11A in the width direction, and a cabinet back surface section 11D almost going down from the rear end part of the cabinet upper surface section 11A.

In this upper case 11, the edge line part at which the cabinet upper surface section 11A, and the cabinet side surface sections 11B and 11C intersect is subjected to a process of chamfering from substantially the center of the projection direction of the projector 1 toward the rear end side thereof, and an indented section 111 dented along the edge line is formed. This indented section 111 is formed to, at the time of stacking two of the projector 1, insert a pipe-shaped support member thereinto for coupling two of the projectors 1.

A slit-like opening section 112 for leading cool air thereinto, is formed at the cabinet side surface section 11B.

At almost the middle part of the cabinet upper surface section 11A, an operation panel 14 is provided for going through an activation/an adjustment operation for the projector 1. This operation panel 14 includes a plurality of switches such as an activation switch, and a switch for image/audio adjustment. At the time of projection by the projector 1, through operation of the adjustment switch and others in the operation panel 14, image/audio adjustment can be accordingly done.

Moreover, toward the front of the cabinet upper surface section 11A in the projection direction, a plurality of holes 141 are formed, and therein, a speaker is accommodated for audio output, which will be described in greater detail below.

The operation panel 14 and the speaker are electrically connected to a control substrate being a part of the device body that will be described later. Operation signals coming from the operation panel 14 are processed by this control substrate.

The cabinet back surface section 11D is formed to be an almost-open frame, and from the opening part, a connector cluster 15 is exposed for inputting image signals and others. The part adjacent thereto is also an opening section for accommodating the light device, and generally, covered with a lid member 16 for accommodating the light device. Herein, the connector cluster 15 is electrically connected to the control substrate, which will be described in greater detail below, and image signals input via the connector cluster 15 are processed by the control substrate.

The rear end part of the cabinet upper surface section 11A and the upper end part of the cabinet back surface section 11D are each attached with a lid member 113 detachable from the upper case 11. Although details will be described later, to the inside of the lid member 113, an expansion board such as a LAN board can be inserted.

The lower case 12 is so structured as to be substantially symmetric with respect to the engagement surface with the upper case 11, and includes a cabinet bottom surface section 12A, cabinet side surface sections 12B and 12C, and a cabinet back surface section 12D.

As to the cabinet side surface sections 12B and 12C, and the cabinet back surface section 12D, their upper end parts engage with the lower end parts of the cabinet side surface sections 11B and 11C, and the cabinet back surface section 11D of the upper case 11. Note here that, similarly to the cabinet back surface section 11D, the cabinet back surface section 12D is also an almost-open frame, and the above-described connector cluster 15 exposes from the opening section after engagement, and a lid member 16 is attached across their both opening sections.

At the corner end part of the cabinet back surface section 12D, another opening section is formed, and therefrom, an inlet connector 17 is exposed. Further, in the cabinet side surface section 12B, another opening section 122 is formed at the corresponding position of the opening section 112 formed in the cabinet side surface section 11B of the upper case 11.

In the cabinet bottom surface section 12A, a fixed leg section 18 is provided at almost the center of the rear end side of the projector 1, and an adjustment leg section 19 is also provided at both ends in the width direction.

The adjustment leg section 19 is structured by a spindle-like member retractably protruding from the cabinet bottom surface section 12A in the direction outward from the surface, and the spindle-like member itself is accommodated inside the exterior case 2. Such an adjustment leg section 19 can be adjusted by its protrusion amount from the cabinet bottom surface section 12A through operation of an adjustment button 191 provided at the side surface part of the projector 1.

With such a structure, the projection images from the projector 1 can be adjusted with their upper and lower positions, thereby rendering the projection images to be formed at their appropriate positions.

Furthermore, in the cabinet bottom surface section 12A, a convex rib-like section 20 is formed almost in the center of the cabinet bottom surface section 12A, extending along the projection direction. Also formed are a plurality of other rib-like sections 21 and 22 extending along the width direction of the projector 1 so as to be perpendicular to the rib-like section 20. Although details are described later, between the two of the rib-like sections 21 locating at intermediate positions, an air intake opening section is formed to intake cool air from the outside, and covered with a filter 23. At the rear end side of the air intake opening section thus covered with this filter 23, another air intake opening section 24 is also formed to intake cool air, but is not covered with a filter.

At the end parts of the rib-like sections 21 and 22 extending along the projector 1 in the width direction, four screw holes 21A are formed. When the projector 1 is suspended from the ceiling, a clasp for hanging the projector from the ceiling is attached to each of the screw holes 21A.

Moreover, at the device rear end side edge of the cabinet bottom surface section 12A, an engagement section 26 is formed. To this engagement section 26, a cover member is attached as a cover for an electronic equipment cabinet that covers the above-described connector cluster 15 to prevent dust from settling thereon.

The front case 13 is structured by including a front surface section 13A and an upper surface section 13B, and a rib 13C extending along the direction outward from the surface, is formed in the outer regions of the front surface section 13A. This rib 13C engages with the tip sides of the upper case 11 and the lower case 12 in the projection direction.

The front surface section 13A is slanting toward the device rear end side, from the cabinet bottom surface section 12A of the lower case 12 to the cabinet upper surface section 11A of the upper case 11. The slanting degree is larger as the distance from the projection surface is larger. The reason of such a structure is to prevent dust from settling on the front case 13 because the front surface section 13A of the front case 13 looks down when the projector 1 is suspended from the ceiling. As such, a consideration is given to the case of ceiling-suspension that often causes maintenance difficulty than the case of normal placement.

As to such a front surface section 13A, almost the center thereof is formed with an opening section 27, and from this opening section 27, the projection lens 3 is exposed. Adjacent to this opening section 27, a slit-like opening section 28 is formed, and the air after cooling inside of the device body of the projector 1 is exhausted from this opening section 28. Moreover, in the vicinity of the corner part of the front surface section 13A, a hole 29 is formed. Inside of this hole 29, there is a light receptive section 30 for receiving operation signals coming from a controller that is not shown.

Note that, in this embodiment, the light receptive section 30 can also be provided on the rear surface side of the projector 1 as an information acquisition section. As shown in FIG. 2, the corner section of the cabinet back surface section 11D of the upper case 11 also has the light receptive section 30. With such a structure, when a remote controller is used, operation signals from the remote controller can be received by both the device front surface side and the device back surface side.

The upper surface section 13B extends to almost the center of the cabinet upper surface section 11A of the upper case 11, and specifically, although not shown, reaches close vicinity of the base end part of the projection lens 3. The reason of such a structure is, at the time of changing the projection lens 3, to allow exchange of the projection lens 3 only by removing the front case 13. When the front case 13 is removed from the upper case 11 and the lower case 12, the upper surface section 13B is accordingly opened, and thus the base end section attached with the projection lens 3 and therearound is exposed.

Figure 3:
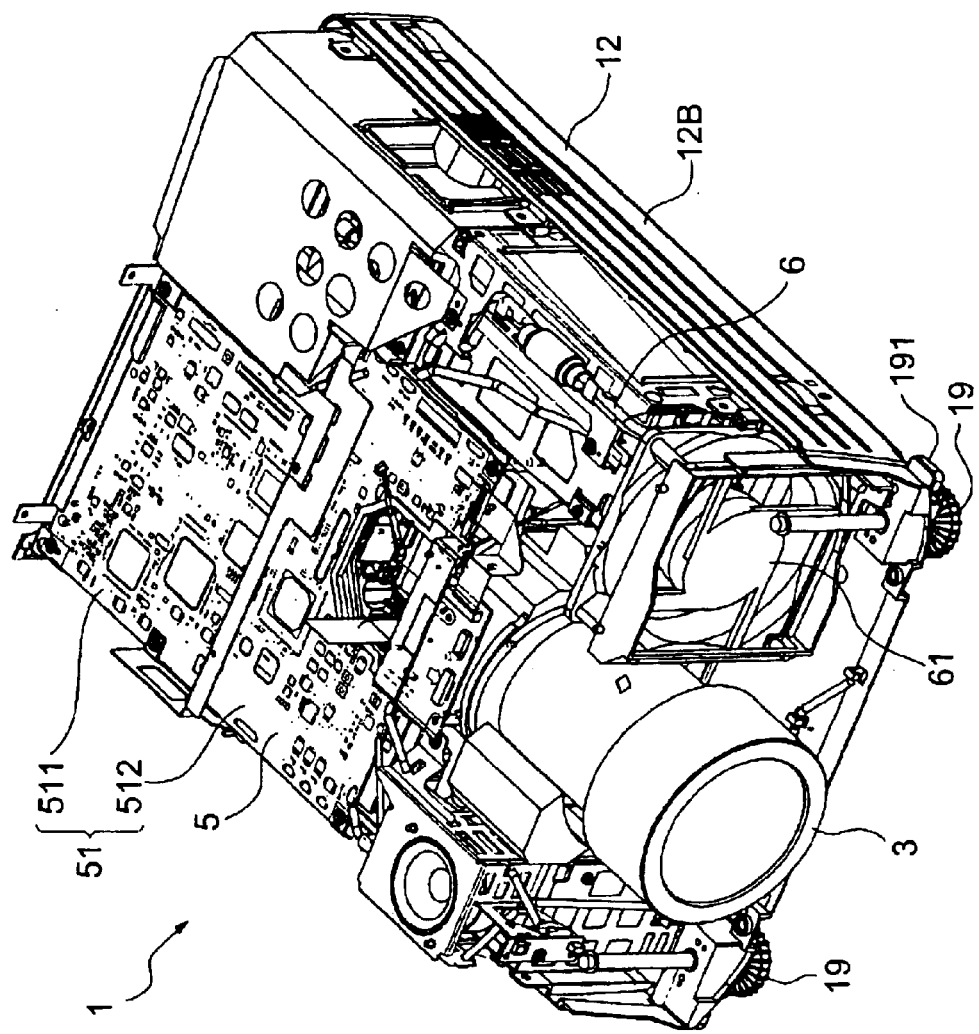
FIG. 3 is a schematic perspective view showing the inner structure of the projector of the embodiment.
Figure 4:
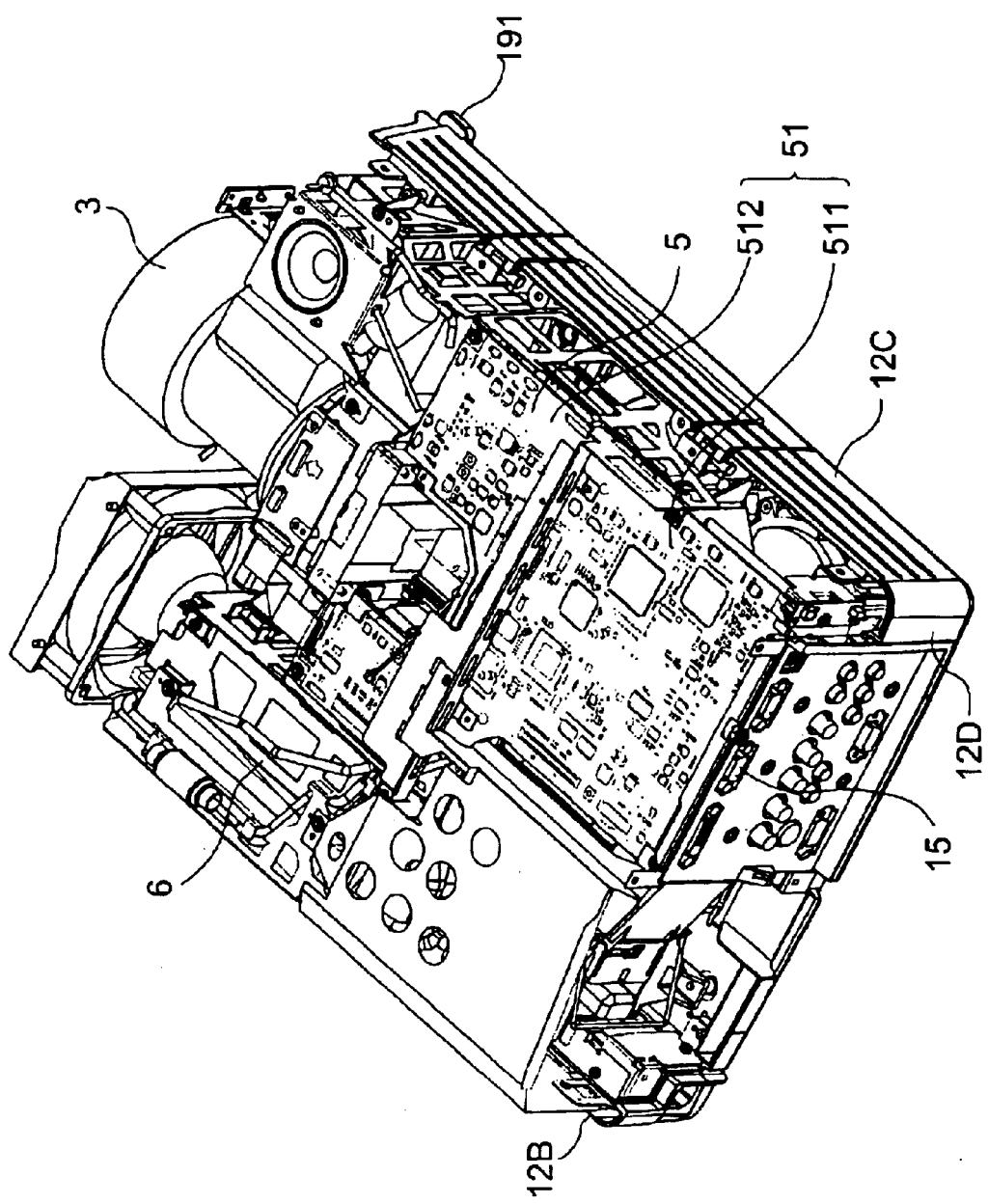
FIG. 4 is a schematic perspective view showing the inner structure of the projector of the embodiment.
Figure 5:
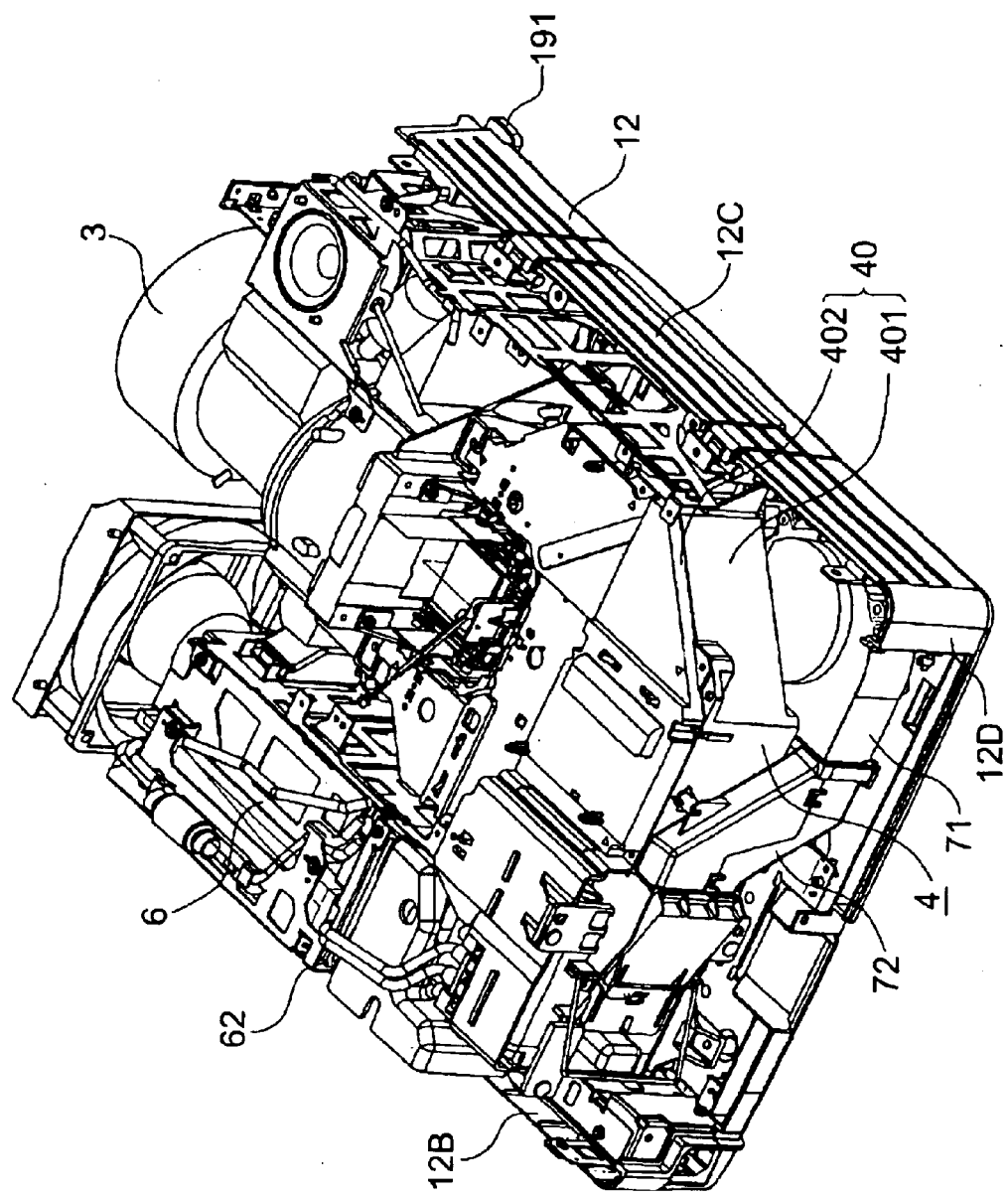
FIG. 5 is a schematic perspective view showing the inner structure of the projector of the embodiment.

As shown in FIGS. 3 to 5, such an exterior case 2 accommodates the device body of the projector 1. This device body is structured by including an optical unit 4, a control substrate 5, and a power source block 6.

The optical unit 4 as an optical engine forms optical images by modulating light fluxes coming from a light source in accordance with image information, and forms projection images on a screen via the projection lens 3. As shown in FIG. 5, it is structured as the one incorporating a light source device, various optical components, and others into a cabinet for optical components referred to as a light guide 40.

This light guide 40 is structured by a lower light guide 401 and an upper light guide 402, both of which are items made of synthesis resin molded by injection molding, for example.

Figure 6:
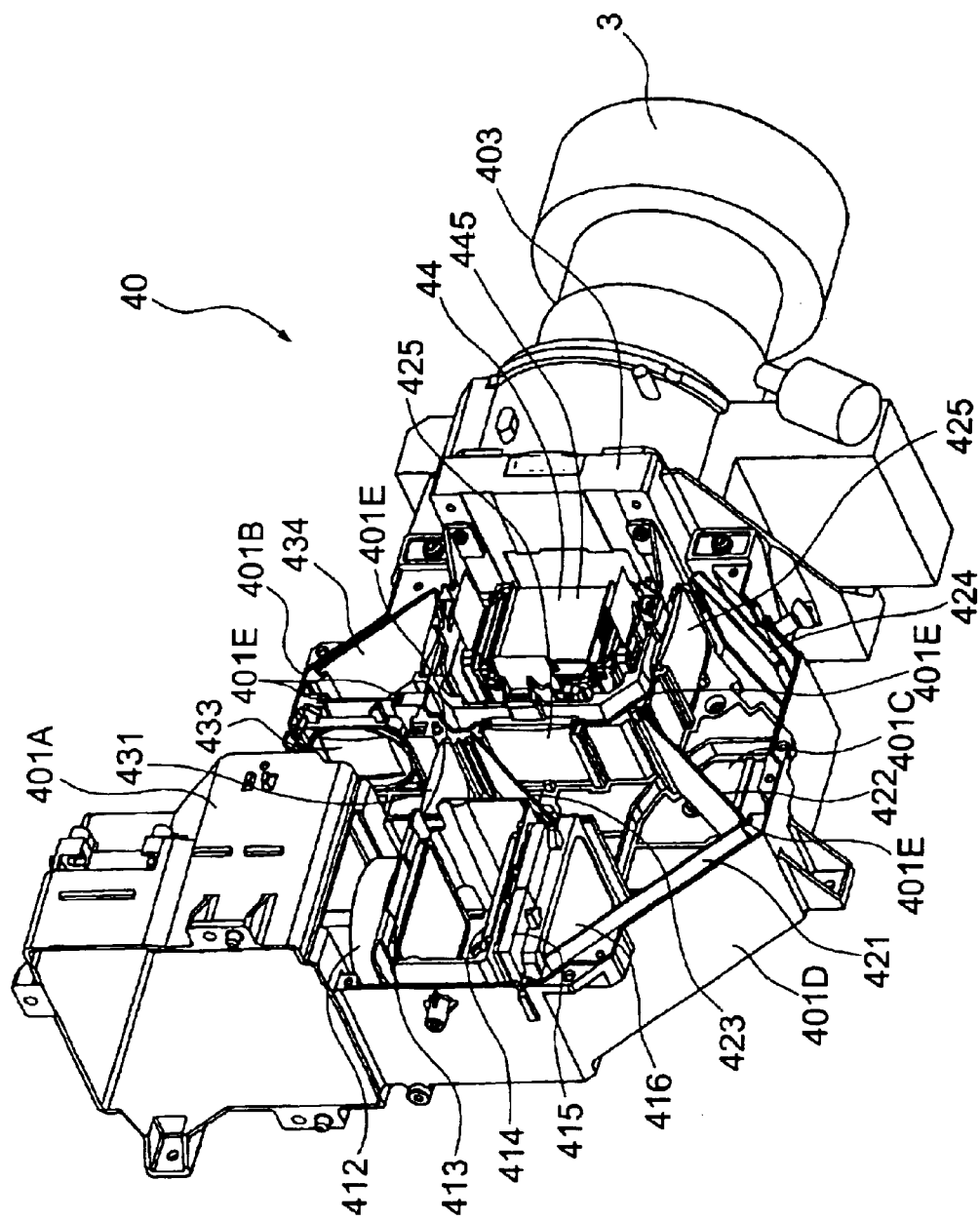
FIG. 6 is a schematic perspective view showing the structure of a light guide for accommodating an optical unit of the embodiment.

As shown in FIG. 6, the lower light guide 401 is provided with a light source housing section 401A for housing a light source device that will be described later, and a component housing section 401B for housing optical components. This component housing section 401B is formed to be a container having a bottom surface section 401C, a side wall section 401D and an open upper part. On the side wall section 401D, a plurality of groove sections 401E is provided. To the groove sections 401E, various optical components structuring the optical unit 4 are attached, and thereby, the optical components are each placed with accuracy on an illumination optical axis set in the light guide 40. The upper light guide 402 is in the planar shape to match with the lower light guide 401, and is so structured as a lid-like member covering the upper surface of the lower light guide 401.

At the light flux emission side end section of the lower light guide 401, a metallic head body 403 having the substantially L-shaped side surface is placed. To the L-shaped horizontal part of the head body 403, an optical device 44 that will be described later is attached, and to the L-shaped vertical part thereof, the base end part of the projection lens 3 is securely affixed.

Figure 7:
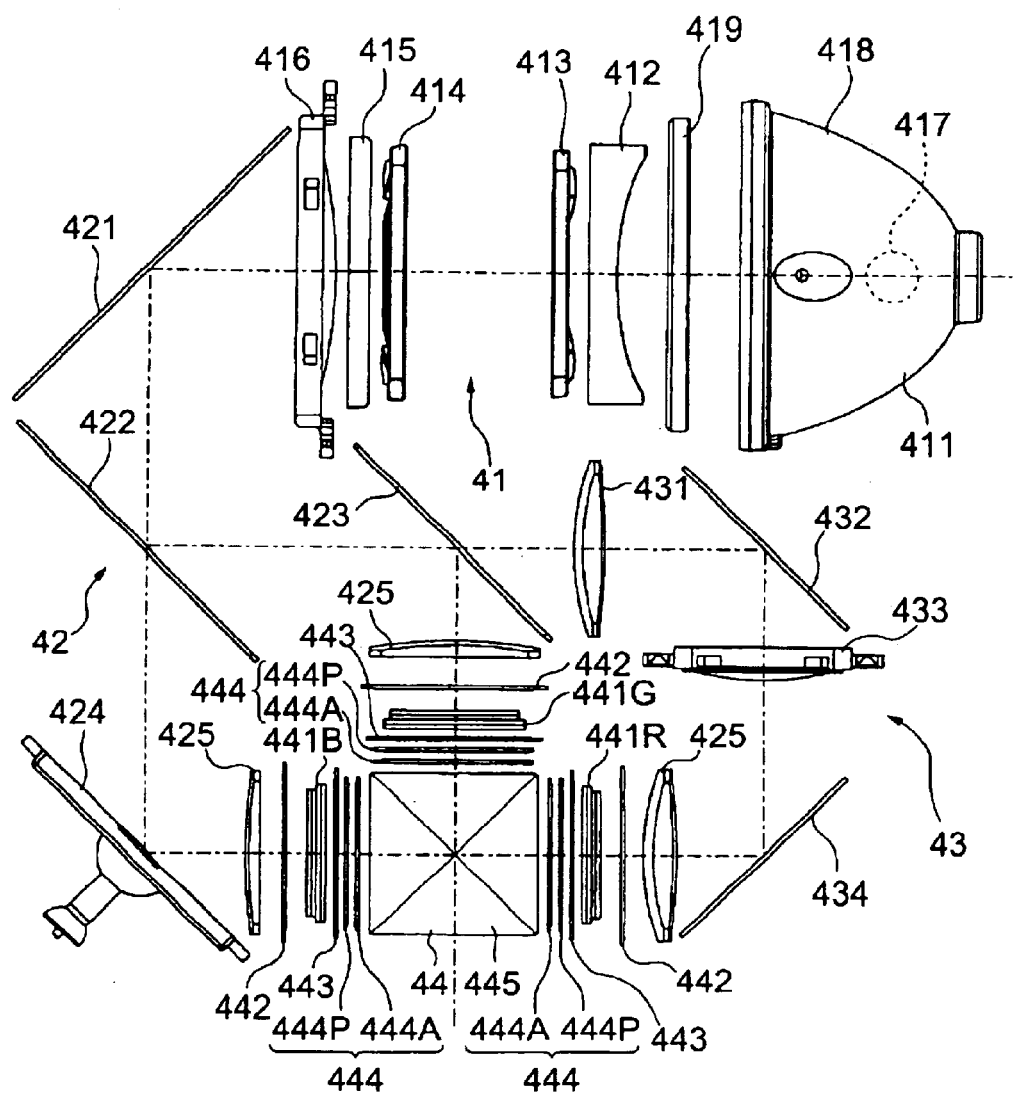
FIG. 7 is a schematic diagram showing the structure of the optical unit of the embodiment.

As shown in FIG. 7, such a light guide 40 is internally broadly grouped into, in view of function, an integrator illumination optical system 41, a color separation optical system 42, a relay optical system 43, and the optical system 44 as integrating a light modulation optical system and a color synthesizing optical system. Here, the optical unit 4 in this embodiment is the one adopted to a three-plate projector, and is structured as an optical unit of a spatial color separation type in which a white light beam coming from a light source is separated in the light guide 40 into three color light beams.

The integrator illumination optical system 41 is an optical system for making uniform the illumination of the light flux coming from the light source in the illumination optical axis orthogonal plane, and structured by including an light source device 411, a collimating concave lens 412, a first lens array 413, a second lens array 414, a polarization conversion element 415, and a superposition lens 416.

The light source device 411 is provided with a light source lamp 417 as a radiation light source, a reflector 418, and a front glass 419 covering the light flux emission plane of the reflector 418. Therein, a radial beam coming from the light source lamp 417 is reflected by the reflector 418, and collimated by the collimating concave lens 412 to make a substantial parallel beam and emit the beam to the outside. In this embodiment, the light source lamp 417 is exemplified by a high-pressure mercury lamp. Other than that, a metal-halide lamp, or a halogen lamp is a possibility. Further, in this embodiment, the structure in which the collimating concave lens 412 is placed on the emission plane of the reflector 418 which comprises an ellipsoid mirror, is adopted. Alternatively, the reflector 418 may be exemplified by a paraboloid mirror.

The first lens array 413 has such a structure that small lenses each having a rectangular contour when viewed from the illumination optical axis are arranged in a matrix. Each of the small lenses divides the light flux coming from the light source lamp 417 into partial light fluxes for emission toward the illumination optical axis. The contour of each of the small lenses is so set as to be approximately similar in shape to image formation regions of liquid crystal panels 441R, 441G, and 441B, which will be described in greater detail below. For example, assuming that the aspect ratio (the ratio of the width to the height) of the image formation regions of the liquid crystal panels 441R, 441G, or 441B is 4:3, the aspect ratio of the small lenses is also set to be 4:3.

The second lens array 414 has almost the same structure as the first lens array 413, and the small lenses thereof are also arranged in a matrix. This second lens array 414 is capable of, together with the superposition lens 416, forming images of the small lenses of the first lens array 413 on the liquid crystal panels 441R, 441G, and 441B.

The polarization conversion element 415 is provided for converting light beams coming from the second lens array 414 into polarization light beams of one kind. Thereby, light utilization rate is improved in the optical device 44.

To be specific, the partial light fluxes after having been subjected to conversion into polarization light beams of one kind by the polarization conversion element 415 are ultimately superposed, on the liquid crystal panels 441R, 441G, and 441B of the optical device 44 by the superposition lens 416. For a projector using such liquid crystal panels 441R, 441G, and 441B of a type modulating polarization light beams, polarization light beams of one kind are only available. Therefore, almost half of the light fluxes coming from the light source lamp 417 that emits random polarization light beams is not used. Accordingly, by using the polarization conversion element 415, every light flux coming from the light source lamp 417 is converted into polarization light beam of one kind, thereby increasing the light efficiency in the optical device 44. Note here that such a polarization conversion element 415 is described in JP-A-8-304739, for example.

The color separation optical system 42 is provided with a reflection mirror 421 for refracting the light fluxes coming from the integrator illumination optical system 41, two dichroic mirrors 422 and 423, and another reflection mirror 424, and has a function of, by the dichroic mirrors 422 and 423, separating a plurality of partial light fluxes coming from the integrator illumination optical system 41 into three color light beams of red (R), green (G), and blue (B). Here, in this embodiment, the reflection mirror 424 can be adjusted in posture with respect to the lower light guide 401.

The relay optical system 43 can include an incident-side lens 431, a relay lens 433, and reflection mirrors 432 and 434, and is capable of guiding, to the liquid crystal panel 441R, red light color beams having been separated by the color separation optical system 42.

At this time, out of the light fluxes coming from the integrator illumination optical system 41, the dichroic mirror 422 of the color separation optical system 42 reflects red light components and green light components, but allows blue light components to pass therethrough. The blue light beams thus allowed to pass through by the dichroic mirror 422 are reflected by the reflection mirror 424, and then reach the liquid crystal panel 441B for blue after going through a field lens 425. This field lens 425 converts the partial light fluxes emitted from the second lens array 414 into light fluxes parallel to their center axis (main beam). This is applicable to another field lens 425 provided at the light incident-side of other liquid crystal panels 441G and 441R.

Out of the red light beams and green light beams reflected by the dichroic mirror 422, the green light beams are reflected by the dichroic mirror 423, and then reach the liquid crystal panel 441G for green after going through the field lens 425. On the other hand, the red light beams are allowed to pass through the dichroic mirror 423, go through the relay optical system 43 and the field lens 425, and then reach the liquid crystal panel 441R for red light beams.

A reason for using the relay optical system 43 for the red light beams is, because the light path of the red light beams is longer than the light path of other color beams, to prevent the light efficiency from lowering due to light divergence and others. In other words, it is to pass the partial light fluxes reached the incident-side lens 431 to the field lens 425 as they are. Herein, the relay optical system 43 is so structured as to pass red light beams out of three color light beams. This is not restrictive, and it may be so structured as to pass blue light beams, for example.

The optical device 44 is the one for forming color images by modulating the incoming light fluxes in accordance with image information, and provided with: three incident-side polarization panels 442 for receiving color light beams having been separated by the color separation optical system 42; the liquid crystal panels 441R, 441G, and 441B as optical modulation devices to be arranged at the stage subsequent to the incident-side polarization plates 442: a viewing angle correction plate 443 and an emission-side polarization plate 444 both to be arranged at the stage subsequent to the liquid crystal panels 441R, 441G, and 441B; and a cross dichroic prism 445 as a color synthesizing optical system. The liquid crystal panels 441R, 441G, and 441B, the viewing angle correction plate 443, the emission-side polarization plate 444, and the cross dichroic prism 445 can be united together to form the optical device body 45. Note here that the optical device body 45 will be described in detail in greater detail below.

Although the details are left for later description, the liquid crystal panels 441R, 441G, and 441B are structured by three panel bodies for modulating the color light beams separated by the color separation optical system 42 in accordance with image information, and three retaining frames for accommodating these panel bodies.

Out of those, in the panel body, a polysilicon TFT is used as a switching element, for example, and the color light beams separated by the color separation optical system 42 are modulated in accordance with the image information by those panel bodies, and the incident-side polarization plates 442 and the emission-side polarization plates 444 to be arranged at their previous and subsequent stages. As such, optical images are accordingly formed.

Out of the color light beams separated by the color separation optical system 42, the incident-side polarization plate 442 as an optical conversion element allows only polarization light beams directing in a fixed direction to pass therethrough, and absorbs other light fluxes. It is structured by attaching a polarization film to a sapphire substrate, for example. Alternatively, without a substrate, a polarization film may be attached to the field lens 425.

The viewing angle correction plate 443 as an optical conversion element has an optical conversion film on a substrate that is capable of correcting the viewing angles of the optical images formed by the liquid crystal panels 441R, 441G, and 441B. Through placement of such a viewing angle correction plate 443, the viewing angle of a projection image can be increased, and the contrast of the projection image can be improved to a greater degree.

Out of the light fluxes having been modulation by the liquid crystal panels 441R, 441G, and 441B, the emission-side polarization plate 444 as an optical conversion element allows only the polarization light beams directing in a fixed direction to pass therethrough, and absorbing the other light fluxes. In this example, it is structured by a first polarization plate (pre-polarizer) 444P and a second polarization plate (analyzer) 444A. The reason of the emission-side polarization plate 444 being the dual structure is to divide proportionately the incoming polarization light beams by the first polarization plate 444P and the second polarization plate 444A for absorption, so that the heat produced by the polarization light beams is divided proportionately by these polarization plates 444P and 444A. Accordingly, the plates can be prevented from getting overheated.

The cross dichroic prism 445 synthesizes the optical images which have been emitted from the emission-side polarization plate 444, and modulated on the basis of color light beam to form color images.

With the cross dichroic prism 445, a dielectric multi-layer film reflecting red light beams and another dielectric multi-layer film reflecting blue light beams are provided in a substantially X shape along the interface of four right-angle prisms. By these dielectric multi-layer films, three color light beams are synthesized.

As shown in FIGS. 3 and 4, the control substrate 5 is so placed as to cover the upper part of the optical unit 4, and includes a main substrate 51 of a laminate structure of two layers. A control section body, such as a processor is implemented, on an upper substrate 511, and for each driving the liquid crystal panels 441R, 441G, and 441B, is implemented on a lower substrate 512. Although not shown, this control substrate 5 is provided with an interface substrate having a connection with the main substrate 51 at the rear end thereof, and standing toward the cabinet back surface sections 11D and 12D of the exterior case 2.

The back surface side of the interface substrate is implemented with the above-described connector cluster 15, and image information coming from the connector cluster 15 is output to the main substrate 51 via this interface substrate.

The processor on the main substrate 51 first subjects thus provided image information to a computation process, and then outputs a control command to the driving IC for the liquid crystal panels. Based on this control command, the driving IC generates and outputs a driving signal for driving the liquid crystal panels 441, and thereby, optical images are formed through optical modulation in accordance with the image information.

Adjacent to the optical unit 4, the power source block 6 can be provided extending along the projection direction of the exterior case 2 of the projector 1. Although not shown, included therein are a power unit and a lamp driving unit.

The power unit supplies power provided from the outside through a power cable connected to the above-described inlet connector 17 to the lamp driving unit, the control substrate 5, and the like.

The lamp driving unit is a conversion circuit for supplying to the above-described light source device 411 power with stable voltage. By this lamp driving unit, the commercial alternating current provided by the power unit is rectified and converted. The resulting direct current and alternating square wave are supplied to the light source device 411.

Toward the front of such a power source block 6, as shown in FIG. 3, an exhaust fan 61 is provided. The air after cooling the components in the projector 1 is collected by this exhaust fan 61 so as to be exhausted from the opening section 28 of the exterior case 2 to the outside of the device.

Figure 8:
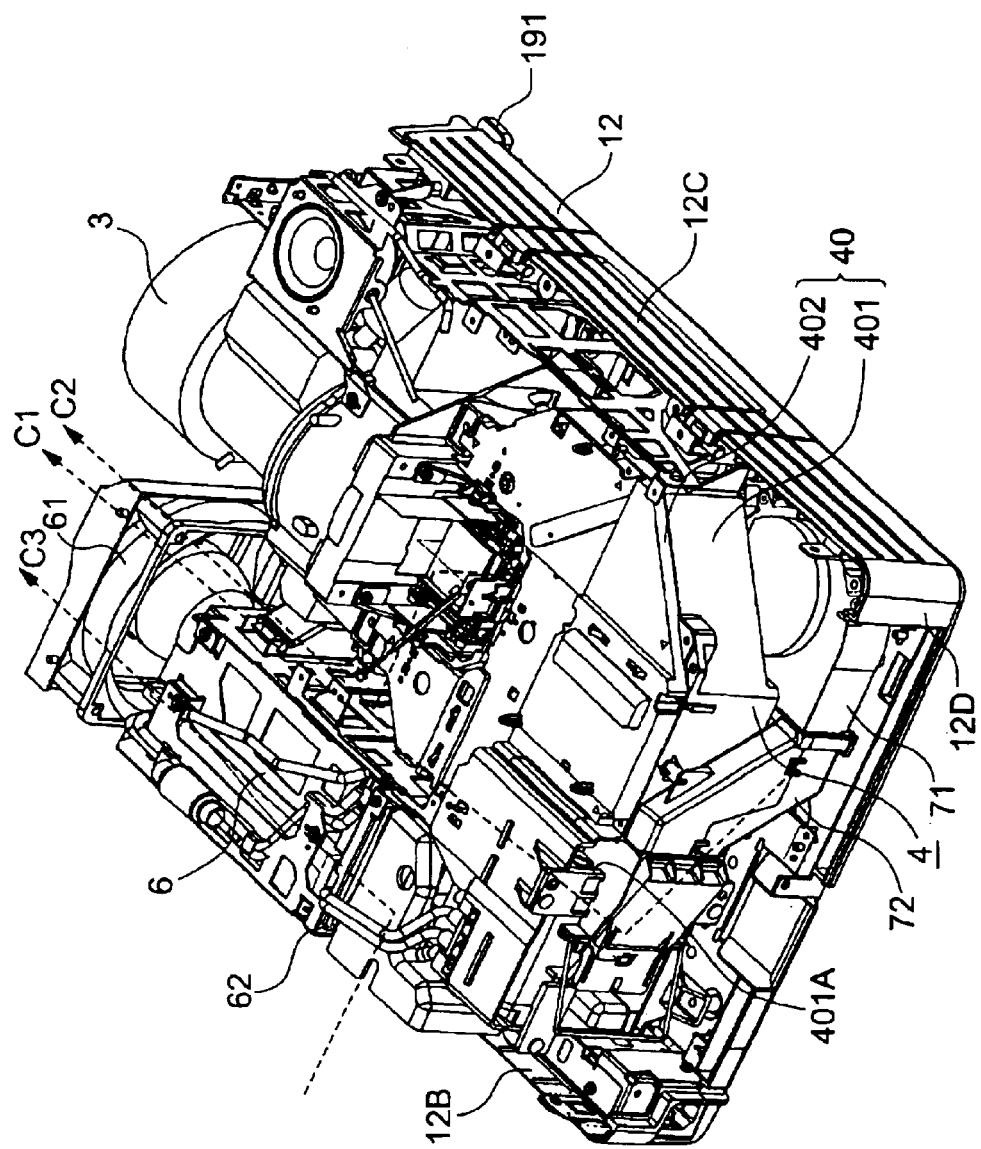
FIG. 8 is a schematic perspective view showing a cooling path of the embodiment.

The inside of such a projector 1 is heated by the heat produced by the light source device 411 and the power source block 6. Thus, the projector needs to cool the light source device 411, the optical device 44, and the power source block 6 in an efficient manner by internally circulating the cool air. Accordingly, in this embodiment, set are three cooling paths C1, C2, and C3 as shown in FIG. 8.

The cooling path C1 is a path for cooling the light source device 411 and the polarization conversion element 415 constituting the integrator illumination optical system 41. Thereby, by a duct 72 from the side of the light source housing section 401A of the light guide 40, the cool air sucked by a sirocco fan 71 which is provided inside the air intake opening section 24 of FIG. 2 is provided to the light source device 411 and the polarization conversion element 415 for cooling those. The air after such cooling is sucked by the exhaust fan 61 to be exhausted to the outside of the projector 1.

The cooling path C2 is a path for cooling the optical device 44 in charge of optical modulation and color synthesis. Thereby, the cool air sucked by a sirocco fan (will be described later) which is provided inside an air intake opening section formed at the position where the filter 23 of FIG. 2 is provided is supplied from the lower part of the optical device 44 to upward to cool the above-described liquid crystal panels 441R, 441G, and 441B, the incident-side polarization plates 442, the viewing angle correction plate 443, and the emission-side polarization plate 444. The air after cooling flows along the lower surface of the main substrate 51 and the cabinet upper surface section 11A of the upper case 11, and then is exhausted to the outside by the exhaust fan 61 while cooling circuit elements implemented onto the main substrate 51.

The cooling path C3 is a path for cooling the power source block 6, and by an air intake fan 62 provided at the rear end side of the power source block 6, intakes cool air from the opening section 112 formed in the cabinet side surface section 11B of the upper case 11, and the opening section 122 formed in the cabinet side surface section 12B of the lower case 12. The resulting cool air is partially supplied to the power unit and the lamp driving unit, and after cooling those, exhausted to the outside by the exhaust fan 61.

Figure 9:
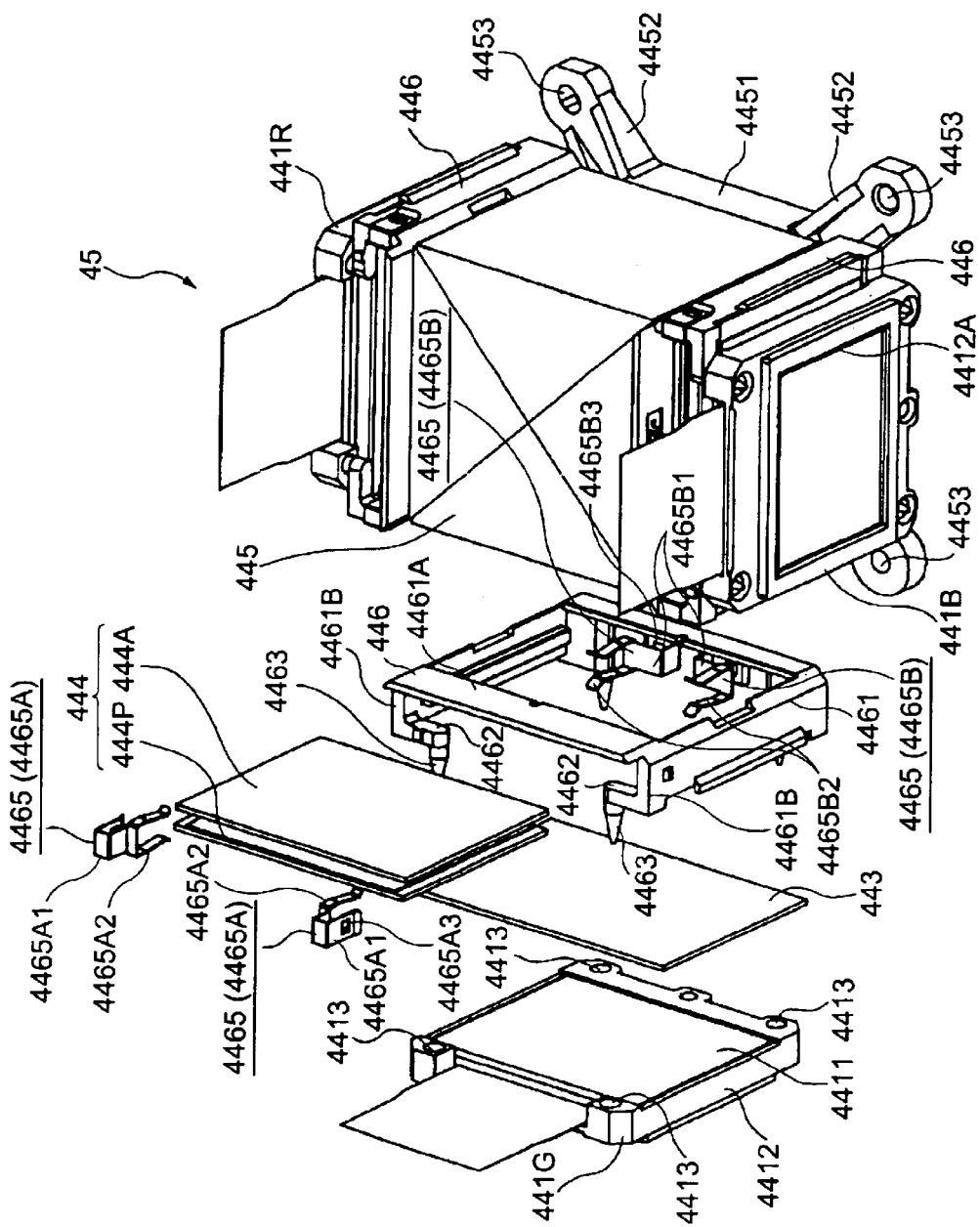
FIG. 9 is an exploded perspective view showing the schematic structure of an optical device body of the embodiment.

FIG. 9 is an exploded perspective view showing the schematic structure of the optical device body 45. Here, for the sake of brevity, shown in FIG. 9 is an exploded view of the side of the liquid crystal panel 441G, and other sides of the liquid crystal panels 441R and 441B are in almost the same structure as the side of the liquid crystal panel 441G. In the following description, the liquid crystal panel 441G is mainly described.

As shown in FIG. 9, the optical device body 45 is the one as a result of uniting together the liquid crystal panels 441R, 441G, and 441B, the viewing angle correction plate 443 and the emission-side polarization plate 444, a panel fixing plate 446 as an optical modulation device retainer for retaining these components, and the cross dichroic prism 445.

The liquid crystal panel 441G is, as shown in FIG. 9, provided with a panel body 4411, and a retaining frame 4412 for accommodating this panel body 4411.

Although not shown, the panel body 4411 is the one derived by hermetically filling liquid crystal into a pair of rectangular transparent substrates opposing to each other. At the pair of transparent substrates of their incident-side and the emission-side, a dustproof glass is each attached.

The retaining frame 4412 is a rectangular member having an indented section for accommodating therein the panel body 4411. In this retaining frame 4412, at its substantially center part when viewed from the top, is formed with an opening section 4412A (refer to FIG. 9 for the liquid crystal panel 441B), and at its substantially four corners when viewed from the top, are each formed with a hole 4413.

After accommodating the panel body 4411 into the concave section of the retaining frame 4412, substantially the center part of the panel body 4411 is externally exposed via the opening section 4412A. This exposed part is the image formation region. In other words, to such parts of the liquid crystal panels 441R, 441G, and 441B, the color light beams R, G, and B are guided, respectively. As such, optical images are formed in accordance with the image information.

Figure 10:
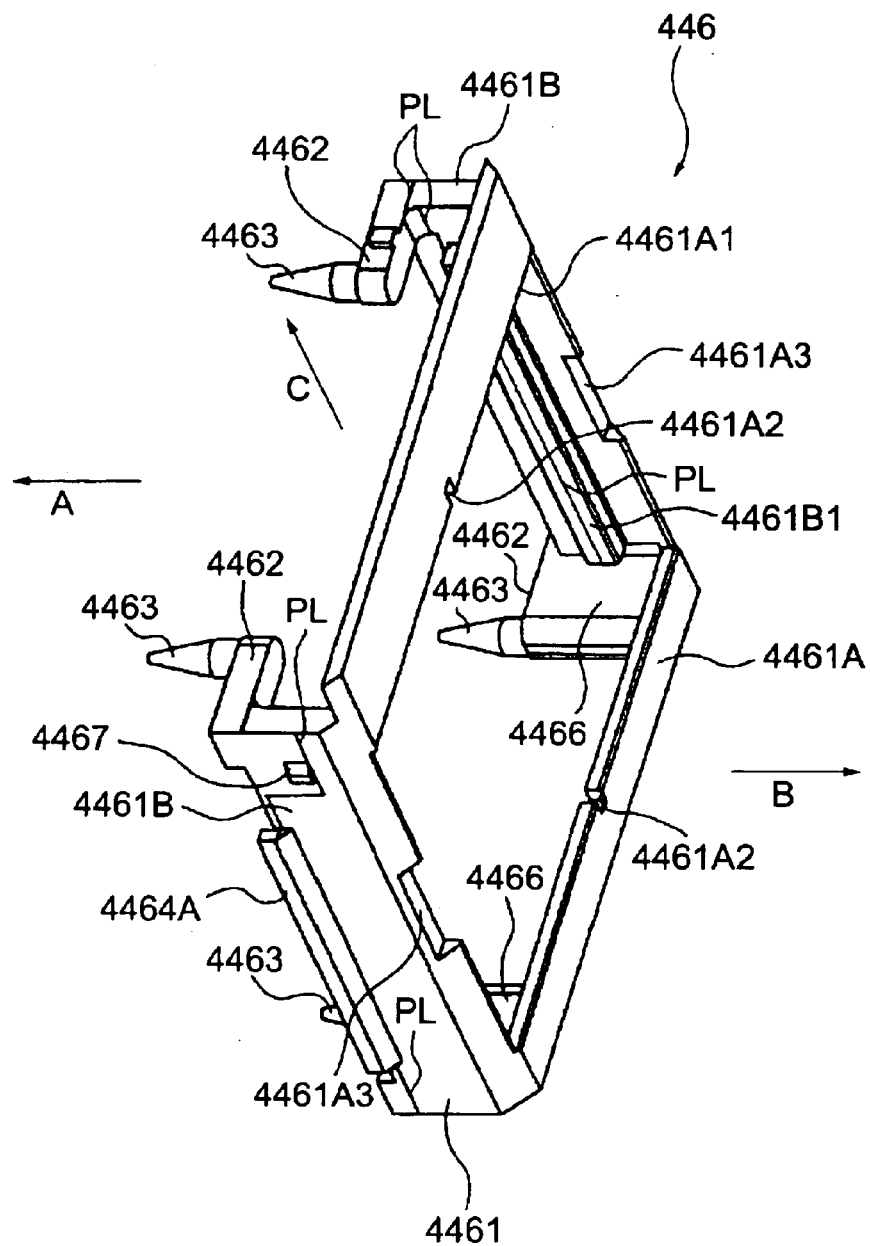
FIG. 10 is a perspective view of a panel fixing plate of the embodiment viewed from the above of a rear side.

FIG. 10 is a perspective view of the panel fixing plate viewed from the above of the rear side.

Figure 11:
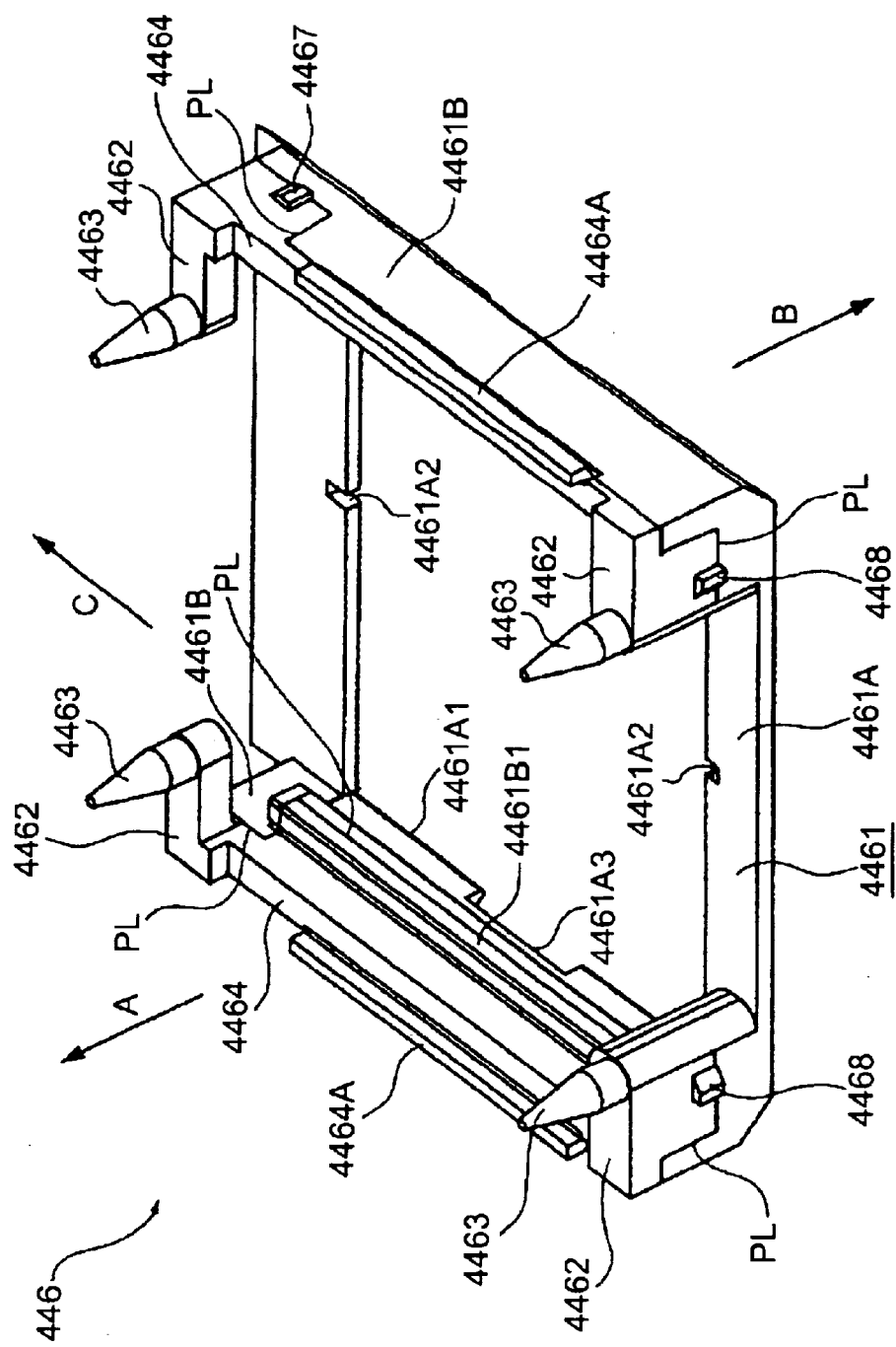
FIG. 11 is a perspective view of the panel fixing plate of the embodiment viewed from the bottom of a front side.

FIG. 11 is a perspective view of the panel fixing plate viewed from the bottom of the front side.

Herein, the rear side of the panel fixing plate 446 is the side to be affixed to the cross dichroic prism 445, and the front side of the panel fixing plate 446 is the back side of the rear side.

The panel fixing plate 446 is provided with: a fixing section body 4461, which is substantially c-shaped in the plane view, an arm section 4462 as an extension section formed at the tip side of this fixing section body 4461; a pin 4463 as an optical modulation device fixing section that is protruded from this arm section 4462; and a spring member 4465 (FIG. 9) as a bias member for biasing the emission-side polarization plate 444 with respect to the fixing section body 4461. In this panel fixing plate 446, as shown in FIG. 9, the first polarization plate 444P and the second polarization plate 444A of the emission-side polarization plate 444 can be inserted into a space formed between the fixing section body 4461 and the arm section 4462.

The fixing section body 4461 is structured by a rectangular plate-like body 4461A, and a pair of standing pieces 4461B locating at a pair of right and left side edges of this rectangular plate-like body 4461A being parallel to each other so as to extend along the end edge of the rectangular plate-like body 4461A.

To the rectangular plate-like body 4461A, an opening section 4461A1 is provided at its substantially center part. In this rectangular plate-like body 4461A, a notch 4461A2 for absorbing any change caused by heat is formed at the upper and lower sides of this opening section 4461A1. Further, at the back surface of the rectangular plate-like body 4461A, an indented section 4461A3 denting in the thickness direction is formed at the right and left side edges of the opening section 4461A1. Moreover, the back side of the rectangular plate-like body 4461A is grain-finished.

The pair of standing pieces 4461B, at the respective end surfaces opposing to each other, is provided with a protrusion section 4461B1 extending in the direction orthogonal to the protrusion direction of the standing pieces 4461B. This protrusion section 4461B1 is placed at almost the center part of the respective end surfaces opposing to each other so as to section each end surface into two regions. In the resulting two regions, the first polarization plate 444P and the second polarization plate 444A of the emission-side polarization plate 444 are placed with a certain distance therebetween.

At the tip side end parts of the pair of standing pieces 4461B, are formed a base 4464 as a support surface for supporting the viewing angle correction plate 443; and a positioning section 4464A extending along the side edge of the standing pieces 4461B to be used as a reference for the outline position of the viewing angle correction plate 443.

Moreover, a first spring fixing section 4467 for fixing the spring member 4465, are formed at the upper part of the end surface of the opposite side of the end surfaces of the pair of standing pieces 4461B opposing to each other.

The arm section 4462 extends from the corresponding corner end part of one of the standing piece 4461B of the fixing section body 4461 in the protrusion direction toward the other opposing standing piece 4461B. In other words, there are four arm sections 4462, a pair for the upper side and another pair for the lower side.

Herein, as to the pair of standing pieces 4461B, the arm section 4462 extends from the lower corner part of the end part in the protrusion direction, toward the opposing standing piece 4461B together with the arm section 4462 from the lower corner end part orthogonal to the protruding end part. With the parts protruding from the lower corner part of the parts of the pair of standing pieces 4461B, a surface orthogonal both to the standing piece 4461B and the rectangular plate-like body 4461A is formed. The resulting surface will be the support surface 4466 for supporting the end parts of the emission-side polarization plate 444.

As to this support surface 4466, the back side thereof is formed with a second spring fixing section 4468 (FIG. 11) for fixing the spring member 4465.

The pin 4463 is placed at the tip side of the arm section 4462, and protrudes from the end surface substantially parallel to the rectangular plate-like body 4461A of the arm section 4462 in the direction almost the same as the protruding direction of the standing piece 4461B. This pin 4463 is tapered, narrowing from the base end side toward the tip end side.

The fixing section body 4461, the arm section 4462, and the pin 4463 described above are all made of aluminum alloy, and integrally molded by injection molding, for example. Herein, the fixing section body 4461, the arm section 4462, and the pin 4463 described above are not restricted to be made of aluminum alloy, but may be made of metal such as aluminum, magnesium, titanium, or alloy of those. Alternatively, a resin is a possibility such as an acrylic material, polycarbonate including carbon fillers, polyphenylene sulfide, liquid crystal resin, and others.

The fixing section body 4461, the arm section 4462, and the pin 4463 to be integrated together are molded by using a mold including three blocks, which is not shown, if molded by injection molding, for example.

The mold has three blocks of a core block, a cavity block, and a slide block. Through combination of these three blocks, compounds are flown into the cavity with the mold being heated at a predetermined temperature. After molding is through, the core block, the cavity block, and the slide block are moved, respectively, in the directions indicated by arrows A, B, and C of FIGS. 10 and 11 with respect to the molded product. In such a manner, the molded product is taken out. Here, the core block molds the arm section 4462 and the pin 4463, the cavity block molds the rectangular plate-like body 4461A, and the slide block molds a part of the standing piece 4461B locating between the rectangular plate-like body 4461A and the arm section 4462. That is, as shown in FIG. 10 or 11, the molded product has parting lines PL as a result of three blocks' combination.

With respect to the protrusion section 4461B1 of the standing piece 4461B, the spring member 4465 biases the first polarization plate 444P and the second polarization plate 444A of the emission-side polarization plate 444 in their thickness direction so that the emission-side polarization plate 444 is fixed to the panel fixing plate 446. This spring member 4465 is structured by, as shown in FIG. 9, a pair of spring members 4465A biasing the upper end surface part of the emission-side polarization plate 444 in the thickness direction, and a pair of spring members 4465B biasing the lower end surface part of the emission-side polarization plate 444 in the thickness direction.

The spring member 4465A is provided with an engagement section 4465A1 engaging to the upper side end part of the standing piece 4461B, and a spring-like section 4465A2 biasing the emission-side polarization plate 444 with respect to the protrusion section 4461B1 of the standing piece 4461B in the thickness direction.

The engagement section 4465A1 is formed to have the c-shape in the cross section, and is so placed that the end part of the standing piece 4461B comes inside of the part of the c-shape. As such, the tip of the c-shaped end biases the end part of the standing piece 4461B. That is, this engagement section 4465A1 is exposed to the outside to be freely inserted and extracted. Further, at the tip of the c-shaped end of the engagement section 4465A1, a hole 4465A3 is formed. With this hole 4465A3, the first spring fixing section 4467 formed to the standing piece 4461B is engaged.

The spring-like section 4465A2 is integrally formed with the tip of the c-shaped end of the engagement section 4465A1, having the substantially c-shape in the cross section. Then, this spring-like section 4465A2 is placed in such a manner that the emission-side polarization plate 444 comes inside of the c-shape. With such a structure, the tip of the c-shaped end C biases, with respect to the protrusion section 4461B1, the upper end surface parts of the first polarization plate 444P and the second polarization plate 444A of the emission-side polarization plate 444.

In detail, as to the engagement section 4465A1 and the spring-like section 4465A2, their placement directions with respect to the components (end parts of the standing pieces 4461B, and the emission-side polarization plate 444) are substantially the same, and the biasing direction of the components by the tip of the c-shaped end is so structured as to be substantially orthogonal.

The spring member 4465B is in almost the same structure as the spring member 4465A, and similarly to the spring member 4465A, includes an engagement section 4465B1 and a spring-like section 4465B2.

The engagement section 4465B1 is formed to have the c-shape in the cross section, and the support surface 4466 is so placed as to come inside of the part of the c-shape, whereby the tip of the c-shaped biases the support surface 4466. With respect to the support surface 4466, this engagement section 4465B1 can be inserted or extracted to/from the direction along the side edge extending along the rectangular plate-like body 4461A in the vertical direction. Further, at the tip of the c-shaped end of the engagement section 4465A1, a hole 4465B3 is formed. The second spring fixing section 4468 formed on the back surface of the support surface 4466 is engaged with this hole 4465B3.

The spring-like section 4465B2 extends substantially orthogonally from the end part of the tip of c-shaped end of the engagement section 4465B1, and is formed to have the cross section of substantially c-shape. This spring-like section 4465B2 is placed in such a manner that the emission-side polarization plate 444 comes inside of the c-shape. As such, the tip of the c-shaped end biases the lower end surface parts of the first polarization plate 444P and the second polarization plate 444A of the emission-side polarization plate 444 with respect to the protrusion section 4461B1.

In detail, as to the engagement section 4465B1 and the spring-like section 4465B2, their placement directions with respect to the components (the support surface 4466, and the emission-side polarization plate 444), and the biasing direction of the components by the tip of the c-shaped end is so structured as to be substantially orthogonal.

As shown in FIG. 9, the lower surface of the cross dichroic prism 445 can be affixed to a prism fixing plate 4451 using an ultraviolet-setting adhesive. This prism fixing plate 4451 includes a leg section 4452 extending along the diagonal line of the cross dichroic prism 445, and the tip of each leg section 4452 is formed with a hole 4453.

The above-described optical device body 45 can be assembled in the following manner. First of all, on the support surface 4466 of the fixing section body 4461, a pair of spring member 4465B are so placed that the engagement section 4465B1 of the spring member 4465B biases the support surface 4466. Here, the second spring fixing section 4468 formed on the back surface of the support surface 4466 is inserted into the hole 4465B3 of the engagement section 4465B1 so as to fix the spring member 4465B to the support surface 4466.

Next, between the rectangular plate-like body 4461A and the arm section 4462 of the fixing section body 4461, the first polarization plate 444P and the second polarization plate 444A are inserted. Here, out of the regions sectioned by the protrusion section 4461B1 of the standing piece 4461B, the first polarization plate 444P is inserted into the region locating on the light flux incident side. The second polarization plate 444A is inserted to the region locating on the light flux emission side.

When inserting the first polarization plate 444P and the second polarization plate 444A between the rectangular plate-like body 4461A and the arm section 4462 of the fixing section body 4461, the lower end parts of the first polarization plate 444P and the second polarization plate 444A are inserted into the tip of the c-shaped end of the spring-like section 4465B2 of the spring member 4465B fixed to the support surface 4466. As to the first polarization plate 444P and the second polarization plate 444A, their lower end parts are supported by the support surface 4466, and their lower end surface parts are biased to the protrusion section 4461B1 by the spring-like section 4465B2.

A pair of spring member 4465A are so placed that the upper end parts of the first polarization plate 444P and the second polarization plate 444A come between the tip parts of the spring-like section 4465A2 of the spring member 4465A from the upper side of the fixing section body 4461. The upper end surface parts of the first polarization plate 444P and the second polarization plate 444A are biased by the spring-like section 4465A2 of the spring member 4465A with respect to the protrusion section 4461B1. Further, the engagement section 4465A1 of a pair of spring members 4465A is so placed that the end part of the standing piece 4461B is inserted into the tip of the c-shaped end of the engagement section 4465A1. Then, the first spring fixing section 4467 formed to the standing piece 4461B is inserted into the hole 4465A3 formed in the engagement section 4465A1 so as to fix the spring member 4465A to the end part of the standing piece 4461B.

With such a structure, the first polarization plate 444P and the second polarization plate 444A are so placed as to be away from each other with a certain distance therebetween by the protrusion section 4461B1, and then are securely fixed to the panel fixing plate 446.

Moreover, the outline position of the viewing angle correction plate 443 is positioned by the positioning section 4464A of the panel fixing plate 446, and the end surface thereof is affixed to the base 4464 using a heat conductive tape or adhesive.

Then, the panel fixing plate 446 to which the viewing angle correction plate 443 and the emission-side polarization plate 444 are securely fixed is affixed to the light flux incident end surface of the cross dichroic prism 445. At this time, the grained end surface of the rectangular plate-like body 4461A of the panel fixing plate 446 is coated with an ultraviolet-setting adhesive, and before the adhesive get cured, this end surface is affixed to the light flux incident end surface of the cross dichroic prism 445.

The pin 4463 of the panel fixing plate 446 is coated with the ultraviolet-setting adhesive, and before the adhesive get cured, the pin is inserted into the hole 4413 of the liquid crystal panel 441G.

In a similar procedure, the liquid crystal panels 441R and 441B are each temporarily fixed to the panel fixing plate 446 before the ultraviolet-setting adhesive gets cured, and then color light beams of red, blue, and green are guided into the corresponding liquid crystal panels 441R, 441G, and 441B. While observing the color light beams emitted from the light flux emission end surface of the cross dichroic prism 445, the panel fixing plate 446 is moved with respect to the light flux emission end surface of the cross dichroic prism 445, and the liquid crystal panels 441R, 441G, and 441B are moved with respect to the pins 4463 of the panel fixing plate 446. In such a manner, the liquid crystal panels 441R, 441G, and 441B are adjusted in position. After such position adjustment, between the light flux incident end surface of the cross dichroic prism 445 and the end surface of the rectangular plate-like body 4461A of the panel fixing plate 446, and between the pins 4463 and the holes 4413 of the liquid crystal panels 441R, 441G, and 441B, ultraviolet ray is irradiated from the tip side of the pins 4463 of the panel fixing plate 446 for positioning and fixation of the panel fixing plates 446 and the liquid crystal panels 441R, 441G, and 441B.

The optical device body 45 assembled as such is jointed and fixed to the L-shaped horizontal part of the above-described head body 403 by a screw and others that are not shown to be inserted into the hole 4453 part of the prism fixing plate 4451.

According to the above-described embodiment, the following effects can be achieved.

The panel fixing plate 446 includes the fixing section body 4461, the arm section 4462, the pins 4463, and the spring member 4465, and the pin 4463 is inserted into the corresponding hole 4413 so that the liquid crystal panels 441R, 441G, and 441B are fixedly retained. With such a structure, unlike the optical device of a conventional structure, for example, there is no need for pins structured as independent components, thereby successfully reducing the number of components. Accordingly, even if the liquid crystal panels 441R, 441G, and 441B become out of order, the liquid crystal panels 441R, 441G, and 441B can be easily exchanged by stripping off the panel fixing plate 446 from the light flux incident end surface of the cross dichroic prism 445.

The fixing section body 4461 of the panel fixing plate 446 includes the rectangular plate-like body 4461A and the standing pieces 4461B, and a space is formed between the rectangular plate-like body 4461A and the arm section 4462. Therefore, this space can be inserted with the emission-side polarization plate 444, whereby not only the liquid crystal panels 441R, 441G, and 441B but also the emission-side polarization plate 444 can be fixedly retained.

The standing piece 4461B of the fixing section body 4461 is so formed as to have almost the same length as the side edge of the rectangular plate-like body 4461A. This prevents any unnecessary light flux from going among the liquid crystal panels 441R, 441G, and 441B and the cross dichroic prism 445. As a result, optical images emitted from the cross dichroic prism 445 can be clearly kept.

The panel fixing plate 446 is provided with the spring member 4465. Accordingly, when the emission-side polarization plate 444 is inserted between the rectangular plate-like body 4461A and the arm section 4462, this spring member 4465 serves well to bias the emission-side polarization plate 444 with respect to the panel fixing plate 446 for fixation. Therefore, the emission-side polarization plate 444 can be favorably fixed without using an adhesive and others, and if the spring member 4465 is removed from the fixing section body 4461, the emission-side polarization plate 444 becomes not biased any more, enabling exchange of the emission-side polarization plate 444 with ease.

To the panel fixing plate 446, the pins 4463 are integrated for fixing the liquid crystal panels 441R, 441G, and 441B. Thus, compared with the structure of the conventional optical device using a plurality of pins, for example, the liquid crystal panels 441R, 441G, and 441B can be easily adjusted in position by changing the positional relationship of the liquid crystal panels 441R, 441G, and 441B via the pin 4463 with respect to the light flux incident end surface of the cross dichroic prism 445. Moreover, fixation of the liquid crystal panels 441R, 441G, and 441B to the panel fixing plate 446 can be increased, and thus the liquid crystal panels 441R, 441G, and 441B are not displaced that much after having been subjected to position adjustment.

The pin 4463 is tapered, narrowing from the base end side toward the tip end side. Thus, irradiation of the ultraviolet ray from the tip side of the pin 4463 will accordingly reach among the holes 4413 of the liquid crystal panels 441R, 441G, and 441B and the pins 4463. Therefore, the liquid crystal panels 441R, 441G, and 441B can be fixed to the panel fixing plate 446 with reliability in a short time.

The spring member 4465 includes a pair of spring members 4465A placed above the panel fixing plate 446, and a pair of spring members 4465B placed therebelow. These spring members 4465 bias four corners of the emission-side polarization plate 444 to the fixing section body 4461. With such a structure, the emission-side polarization plate 444 can be securely fixed by the panel fixing plate 446 with reliability, and thus the emission-side polarization plate 444 can be prevented from position displacement.

The spring members 4465A and 4465B include the engagement sections 4465A1 and 4465B1, and the spring-like sections 4465A2 and 4465B2, respectively. The engagement sections 4465A1 and 4465B1 are both exposed to the outside from the fixing section body 4461 to be freely inserted or extracted. With such a structure, the spring member 4465 itself can be easily inserted or extracted into/from the fixing section body 4461, and this eases exchange of the emission-side polarization plate 444 to a greater degree.

The end surface opposing to the pair of standing piece 4461B is formed with the protrusion section 4461B1. With such a structure, the first polarization plate 444P and the second polarization plate 444A of the emission-side polarization plate 444 can be fixed to the protrusion section 4461B as if sandwiched while biased by the spring member 4465. Therefore, by biasing the protrusion section 4461B1 in the same axial direction, the first polarization plate 444P and the second polarization plate 444A are both easily fixed to the fixing section body 4461.

The protrusion section 4461B is formed along the direction into which the emission-side polarization plate 444 is inserted to the panel fixing plate 446. Thus, by biasing the emission-side polarization plate 444 with respect to the protrusion section 4461B1, the emission-side polarization plate 444 can be prevented from positionally displacing into the direction orthogonal to the insertion direction.

By the protrusion section 4461B1, the first polarization plate 444P and the second polarization plate 444A of the emission-side polarization plate 444 are placed with a certain space therebetween. Thus, the heat which is divided proportionately by the first polarization plate 444P and the second polarization plate 444A can be efficiently released.

A pair of standing pieces 4461B are formed with the support surface 4466. This allows placement of the emission-side polarization plate 444 to be inserted by the support surface 4466, whereby the emission-side polarization plate 444 can be favorably remained biased by the spring member 4465.

The rectangular plate-like body 4461A is formed with a notch 446A2 at the upper and lower side edges of the opening section 4461A1. Accordingly, even if the panel fixing plate 446 receives any thermal stress by the heat produced by the liquid crystal panels 441R, 441G, and 441B, and the emission-side polarization plate 444, the panel fixing plate 446 can be prevented from changing in outer shape. This thus prevents position displacement of the liquid crystal panels 441R, 441G, and 441B, and the emission-side polarization plate 444.

The emission-side polarization plate 444 is structured by the first polarization plate 444P and the second polarization plate 444A each including a polarization film having each different light absorption property. Such a polarization film is the one normally singly provided. Thus, the heat of light fluxes to be absorbed by the emission-side polarization plate 444 is proportionately divided, and thus the heat amount to be absorbed by the polarization plates can be reduced. Thereby, heat deterioration hardly occurs, and the resistance of the polarization films can be increased, and the reliability of the polarization film function can be retained.

The back surface of the rectangular plate-like body 4461A is grain-finished. Thus, at the time when the panel fixing plate 446 is fixed to the light flux incident end surface of the cross dichroic prism 445 using the adhesive, the adhesive area is increased, and thus the panel fixing plate 446 can be fixed with a greater strength. Accordingly, the liquid crystal panels 441R, 441G, and 441B are not positionally displaced so much with respect to the cross dichroic prism 445.

The back surface of the rectangular plate-like body 4461A is formed with the concave section 4461A3 denting in the thickness direction at the right and left side edges of the opening section 4461A1. With such a structure, after fixing, using the adhesive, the panel fixing plate 446 to the light flux incident end surface of the cross dichroic prism 445, if the liquid crystal panels 441R, 441G, and 441B are required to be exchanged during or after their manufacturing process, for example, the panel fixing plate 446 can be easily stripped off from the cross dichroic prism 445 by inserting a tool such as a driver into this concave section 4461A3.

The tip part of the standing piece 4461B in the protruding direction is formed with the base 4464. Thus, other than the liquid crystal panels 441R, 441G, and 441B, and the emission-side polarization plate 444, the viewing angle correction plate 443 can be also fixed to the panel fixing plate 446.

Note here that the invention is not restricted to the above embodiment, and includes the following modified structures.

In the above embodiment, the standing piece 4461B of the panel fixing plate 446 is so formed as to have almost the same length as the right and left side edges of the rectangular plate-like body 4461A, but this is not restrictive. For example, it may be so structured as to have almost the same length as the upper and lower side edges of the rectangular plate-like body 4461A. Alternatively, a plurality of standing pieces may be protruded from the right and left side edges or from the upper and lower side edges of the rectangular plate-like body 4461A. That is, the standing piece 4461B is so formed as to produce a predetermined space between the rectangular plate-like body 4461A and the arm section 4462.

In the above embodiment, described is the structure that the arm section 4462 extends toward the standing piece 4461B opposing from the corner end part in the protrusion direction of the standing piece 4461B, but this is not restrictive. For example, it may be so structured as to have almost the same length as the side edge of the standing piece 4461B. Alternatively, for example, the number of the corner parts is not restricted to four, and may be two, and in a possible structure, a plurality of arm sections 4462 may extend from a predetermined side edge of the standing piece 4461B.

In the above embodiment, the spring member 4465 is structured by four pieces, i.e., one pair of spring members 4465A and another pair of spring members 4465B, but this is not restrictive. For example, it may be structured by a piece, or any other number will do.

In the above embodiment, the protrusion section 4461B1 is formed on each of the end surfaces opposing to a pair of standing pieces 4461B. This is not restrictive, and two or more of those may be formed. In such a structure, a plurality of optical conversion elements can be securely fixed to the panel fixing plate 446. For example, other than a polarization plate as an optical conversion element, a possibility may be a phase difference plate, an optical compensation plate exemplified by a color correction plate, and others.

In the above embodiment, the hole 4413 of the retaining frame 4412 of the liquid crystal panel 441R, 441G, or 441B is formed at each of four corners. This is not restrictive, and it may be formed at least two. Further, the pin 4463 of the panel fixing plate 446 may be so formed as to correspond to the number and position of the hole 4413.

In the above embodiment, described is the structure in which the panel fixing plate 446 is affixed to the light flux incident end surface of the cross dichroic prism 445, but this is not restrictive. For example, in an alternative structure, it may be affixed to the side surface of the prism fixing plate 4451 that is to be fixed to the lower surface of the cross dichroic prism 445. If this is the case, the upper surface of the cross dichroic prism 445 may also be fixed with almost the same base as the lower surface, and the panel fixing plate 446 may be fixed to the side surfaces of the bases fixed to the upper and lower surfaces. In such a structure, the panel fixing plate 446 can be stably fixed.

In the above embodiment, the ultraviolet-setting adhesive is used for fixation of he panel fixing plate 446 and the cross dichroic prism 445, and fixation of the panel fixing plate 446 and the liquid crystal panels 441R, 441G, and 441B. This is not restrictive, and the thermosetting adhesive may be used, for example.

In the above embodiment, described is the projector 1 using three liquid crystal panels. This is not restrictive, and an application is possible to a projector using only one liquid crystal panel, a projector using two liquid crystal panels, or a projector using four or more liquid crystal panels.

In the above embodiment, the present invention is applied to the optical unit 4 in the U shape when viewed from the top. This is not restrictive, and the present invention may be applied to the optical unit 4 in the shape of letter L when viewed from the top.

In the above embodiment, an optical modulation element is a liquid crystal panel. Alternatively, an optical conversion element is not restricted to the liquid crystal, and may be a device using a micromirror.

In the above embodiment, an optical modulation element used is of a through type each for a light incident surface and a light emission surface. Alternatively, an optical modulation element may be of a reflection type same as the light incident surface and the light emission surface. Here, "through type" means a type in which an optical modulation device such as a liquid crystal panel and others pass light beams, and "reflection type" means a type of reflecting light beams.

The above embodiments describe only an exemplary projector of a front type performing projection the direction for observing a screen. However, it should be understood that the invention is applicable to a projector of a rear type performing projection from the opposite from that for observing the screen.

What is claimed is:

1. An optical modulation device retainer that retains a light modulator that modulates an incoming light flux in accordance with image information, comprising:
    a rectangular plate-like body having an opening section at a substantially center thereof that passes through the incoming light flux;
    a pair of standing pieces that protrude from a pair of parallel side edges of the rectangular plate-like body, and that extend along a direction into which an end edge of the rectangular plate-like body extends;
    an extension section that is provided at a tip of each of the standing pieces to extend toward the opposing standing piece; and
    a light modulator fixing section formed at a tip of the extension section that fixes the light modulator, a space enclosed by the rectangular plate-like body and the pair of standing pieces being inserted with one or more of optical conversion elements each including a substrate formed with an optical conversion film that converts an optical property of the incoming light flux, the optical conversion element being fixed with biased in a thickness direction of the substrate by a bias member.

2. The optical modulation device retainer according to claim 1, further comprising:
    the light modulator including a light modulation element performing light modulation, and a retaining frame having an opening section corresponding to an image formation region of the light modulation element and being formed with at least two holes,
    the extension sections being formed so as to correspond to the holes of the retaining frame, and
    the light modulator fixing section being a pin protruding from the extension section to be inserted into the hole of the retaining frame.

3. The optical modulation device retainer according to claim 2, the light modulator fixing section being tapered, narrowing from a base end side toward a tip end side.

4. The optical modulation device retainer according to claim 1, a protrusion section extending along an insertion direction of the optical conversion element being formed at inner surfaces of the pair of standing pieces, and the bias member biasing the substrate of the optical conversion element to the protrusion section.

5. The optical modulation device retainer according to claim 4, the bias member including an engagement section that engages with an optical element insertion side end part of one of the standing pieces, and a spring-like section that is formed at an end part of the engagement section extending outward, to bias the substrate by abutting to the substrate of the optical conversion element.

6. The optical modulation device retainer according to claim 1, the rectangular plate-like body or one of the standing pieces being formed with a support surface that supports an end part of the optical conversion element, which is inserted into the space enclosed by the rectangular plate-like body and the pair of standing pieces.

7. The optical modulation device retainer according to claim 1, the rectangular plate-like body being formed with a notch that absorbs any change caused by heat.

8. An optical device, comprising:
    a plurality of light modulators that modulate a plurality of color light beams in accordance with image information on a color light beam basis;
    a color synthesizing optical unit that synthesizes the color light beams which are modulated by the light modulators, the light modulators and the color synthesizing optical unit being integrally formed;
    a plurality of optical modulation device retainers that retain the plurality of light modulators; and
    a plurality of optical conversion elements, each including an optical conversion film formed on a substrate that converts an optical property of an incoming light flux, each optical modulation device retainer including:

a rectangular plate-like body having an opening section at a substantially center thereof that passes incoming light flux;

a pair of standing pieces, which protrude from a pair of parallel side edges of the rectangular plate-like body and extend along a direction into which an end edge of the rectangular plate-like body extends;

an extension section provided at a tip of each of the standing pieces to extend toward the opposing standing piece;

a light modulator fixing section formed at a tip of the extension section for fixing a light modulator; and a bias member for fixing one of the plurality of optical conversion elements to the optical modulation device retainer, the one of the plurality of optical conversion elements being inserted into a space, which is enclosed by the rectangular plate-like body and the pair of standing pieces and fixed to the optical modulation device retainer with biased in a thickness direction of the substrate of the one of the plurality of optical conversion elements by the bias member, and the light modulator being fixed to the color synthesizing optical unit via the optical modulation device retainer.

9. The optical device according to claim 8, the light modulator including a light modulation element performing light modulation, and a retaining frame, which has an opening section corresponding to an image formation region of the light modulation element and that is formed with at least two holes, the extension sections of the optical modulation device retainer being formed so as to correspond to the holes of the retaining frame of the light modulator, and each light modulator fixing section being a pin protruding from each extension section to be inserted into each hole of the retaining frame.

10. The optical device according to claim 9, the light modulator fixing section being tapered, narrowing from a base end side toward a tip end side.

11. The optical device according to claim 8, a protrusion section extending along an insertion direction of the optical conversion element is formed at an inner surface of the pair of the standing pieces of the optical modulation device retainer, and the bias member biasing the substrate of the optical conversion element to the protrusion section.

12. The optical device according to claim 11, the bias member of the optical modulation device retainer including an engagement section that engages with an optical element insertion side end part of one of the standing pieces, and a spring-like section formed at an end part of the engagement section extending outward, to bias the substrate of the optical conversion element by abutting to the substrate.

13. The optical device according to claim 8, the rectangular plate-like body or one of the standing pieces of the optical modulation device retainer being formed with a support surface that supports an end part of the optical conversion element to be inserted into the space enclosed by the rectangular plate-like body and the pair of standing pieces.

14. The optical device according to claim 8, the rectangular plate-like body of the optical modulation device retainer being formed with a notch that absorbs any change caused by heat.

15. The optical device according to claim 8, the optical conversion element to be inserted into the space enclosed by the rectangular plate-like body and the pair of standing pieces of the optical modulation device retainer being a polarization element that converts a polarization axis of the incoming light flux, and the polarization element having two or more polarization films whose polarization axes are parallel to each other and whose light absorption property is different.

16. The optical device according to claim 15, the optical conversion element including the substrate formed with the at least two or more polarization films being placed so as to sandwich the protrusion section, and the substrate thereof being fixed with biased by the bias member, and the at least two or more polarization films being placed with a certain space therebetween by the protrusion section.

17. The optical device according to claim 8, a back surface of the rectangular plate-like body formed with one of the standing pieces of the optical modulation device retainer being fixed to the color synthesizing optical unit using a thermosetting adhesive or a light curing adhesive, and a back surface of the rectangular plate-like body being grain-finished.

18. The optical device according to claim 8, the rectangular plate-like body of the optical modulation device retainer having an indented section formed at a part of an end surface fixed to the color synthesizing optical unit.

19. The optical device according to claim 8, a support surface being formed at a tip of the standing piece of the optical modulation device retainer that supports other optical conversion elements.

20. The optical device according to claim 8, the standing pieces being formed so as to have the same length as a pair of parallel side edges of the rectangular plate-like body.

21. A projector, comprising:

a light source;

an optical device in which a plurality of light modulators modulate a plurality of color light beams in accordance with image information on a color light beam basis and a color synthesizing optical device that synthesizes the color light beams having been subjected to modulation by the light modulators;

a projection optical system that enlarges and projects an optical image to be emitted from the optical device;

a plurality of optical modulation device retainers that retain the plurality of light modulators, and a plurality of optical conversion elements, each including an optical conversion film formed on a substrate for converting an optical property of an incoming light flux, each optical modulation device retainer including:

a rectangular plate-like body having an opening section at a substantially center thereof that passes incoming light flux;

a pair of standing pieces, which protrude from a pair of parallel side edges of the rectangular plate-like body and extend along a direction into which an end edge of the rectangular plate-like body extends;

an extension section provided at a tip of each of the standing pieces to extend toward the opposing standing piece;

a light modulator fixing section formed at a tip of the extension section for fixing a light modulator; and a bias member that fixes the optical conversion element to the optical modulation device retainer, and one of the plurality of optical conversion elements being inserted into a space enclosed by the rectangular plate-like body and the pair of standing pieces to be fixed to the optical modulation device retainer with biased in a thickness direction of the substrate of the one of the plurality of optical conversion elements by the bias member; and the light modulator being fixed to the color synthesizing optical device via the optical modulation device retainer.

22. The projector according to claim 21, the light modulator including a light modulation element performing light modulation, and a retaining frame, which has an opening section corresponding to an image formation region of the light modulation element and that is formed with at least two holes, the extension sections of the optical modulation device retainer being formed so as to correspond to the holes of the retaining frame of the light modulator, and the light modulator fixing section being a pin protruding from each extension section to be inserted into each hole of the retaining frame.

23. The projector according to claim 22, the light modulator fixing section being tapered, narrowing from a base end side toward a tip end side.

24. The projector according to claim 21, a protrusion section extending along an insertion direction of the optical conversion element being formed on inner surfaces of the pair of standing pieces of the optical modulation device retainer, and the bias member biasing the substrate of the optical conversion element to the protrusion section.

25. The projector according to claim 24, the bias member of the optical modulation device retainer including an engagement section that engages with an optical element insertion side end part of one of the standing pieces, and a spring-like section formed at an end part of the engagement section extending outward, to bias the substrate of the optical conversion element by abutting to the substrate.

26. The projector according to claim 21, the rectangular plate-like body or one of the standing pieces of the optical modulation device retainer being formed with a support surface that supports an end part of the optical conversion element to be inserted into a space enclosed by the rectangular plate-like body and the pair of standing pieces.

27. The projector according to claim 21, the rectangular plate-like body of the optical modulation device retainer being formed with a notch that absorbs any change caused by heat.

28. The projector according to claim 21, the optical conversion element to be inserted into the space enclosed by the rectangular plate-like body and the pair of standing pieces of the optical modulation device retainer being a polarization element that converts a polarization axis of the incoming light flux, and the polarization element having at least two or more polarization films whose polarization axes are parallel to each other and whose light absorption property is different.

29. The projector according to claim 28, the optical conversion element including the substrate formed with the at least two or more polarization films being placed so as to sandwich the protrusion section, and the substrate thereof being biased by the bias member, and the at least two or more polarization films being placed with a certain space therebetween by the protrusion section.

30. The projector according to claim 21, a back surface of the rectangular plate-like body formed with one of the standing pieces of the optical modulation device retainer being fixed to the color synthesizing optical device using a thermosetting adhesive or a light curing adhesive, and the back surface of the rectangular plate-like body being grain-finished.

31. The projector according to claim 21, the rectangular plate-like body of the optical modulation device retainer having an indented section formed at a part of an end surface fixed to the color synthesizing optical device.

32. The projector according to claim 21, a support surface being formed at a tip of the standing piece of the optical modulation device retainer that supports other optical conversion elements.

33. The projector according to claim 21, the standing pieces being so formed as to have the same length as a pair of parallel side edges of the rectangular plate-like body.

* * * * *